US007007453B2

(12) United States Patent
Maisotsenko et al.

(10) Patent No.: US 7,007,453 B2
(45) Date of Patent: Mar. 7, 2006

(54) POWER SYSTEM AND METHOD

(75) Inventors: Valeriy Stepanovich Maisotsenko, Aurora, CO (US); Leland Earl Gillan, Denver, CO (US); Timothy Lawrence Heaton, Arvada, CO (US); Alan Dale Gillan, Denver, CO (US)

(73) Assignee: IDALEX Technologies, Inc., Arvada, CO (US)

( * ) Notice: Subject to any disclaimer, the term of this patent is extended or adjusted under 35 U.S.C. 154(b) by 325 days.

(21) Appl. No.: 10/621,271

(22) Filed: Jul. 17, 2003

(65) Prior Publication Data

US 2004/0103637 A1    Jun. 3, 2004

Related U.S. Application Data

(60) Provisional application No. 60/421,754, filed on Oct. 28, 2002, provisional application No. 60/397,322, filed on Jul. 20, 2002.

(51) Int. Cl.
*F02C 7/10* (2006.01)

(52) U.S. Cl. .................... 60/39.511; 415/178

(58) Field of Classification Search ............ 60/39.5, 60/39.511, 690, 693; 415/177, 178
See application file for complete search history.

(56) References Cited

U.S. PATENT DOCUMENTS

| | | | |
|---|---|---|---|
| 2,186,706 A | 1/1940 | Martinka | |
| 2,869,324 A | 1/1959 | Foote | |
| 3,335,565 A | 8/1967 | Aguet | |
| 3,369,361 A | 2/1968 | Craig | |
| 3,877,218 A | 4/1975 | Nebgen | |
| 3,978,661 A | 9/1976 | Cheng | |
| 4,418,527 A | 12/1983 | Schlom et al. | |
| 4,509,324 A | 4/1985 | Urbach et al. | |
| 4,537,023 A | 8/1985 | Nakamura et al. | |
| 4,829,763 A | 5/1989 | Rao | |
| 5,160,096 A | 11/1992 | Perkins et al. | |
| 5,178,210 A | 1/1993 | Guillet et al. | |
| 5,203,161 A | 4/1993 | Lehto | |
| 5,241,816 A | 9/1993 | Drnevich | |
| 5,329,758 A | 7/1994 | Urbach et al. | |
| 5,349,810 A | 9/1994 | Landalv | |
| 5,453,223 A | 9/1995 | Maisotsenko | |
| 5,790,972 A | 8/1998 | Kohlenberger | |
| 5,894,729 A | 4/1999 | Proeschel | |
| 6,158,238 A | 12/2000 | Lampinen et al. | |
| 6,176,075 B1 | 1/2001 | Griffin, Jr. | |

(Continued)

FOREIGN PATENT DOCUMENTS

SU    1070385    1/1984

(Continued)

OTHER PUBLICATIONS

Heaton, "The Maisotsenko Cycle and the idalex Heat and Mass Exchanger," Dec. 2000, 4 pages.

(Continued)

*Primary Examiner*—Ehud Gartenberg
(74) *Attorney, Agent, or Firm*—Francis L. Conte

(57) ABSTRACT

A power system includes a device for extracting energy from a hot gas stream to power a driveshaft. An evaporative duplex counterheat exchanger is disposed in flow communication with the energy extracting device. The duplex exchanger includes a first heat exchanger having a first main flow channel, and a counterheat channel joined in flow communication therewith. A second heat exchanger includes a second main flow channel adjacent the counterheat channel. And, an evaporative fluid is injected into the counterheat channel to evaporatively cool the flow through both main flow channels.

59 Claims, 13 Drawing Sheets

U.S. PATENT DOCUMENTS

| | | |
|---|---|---|
| 6,497,107 B1 | 12/2002 | Maisotsenko et al. |
| 6,581,402 B1 | 6/2003 | Maisotsenko et al. |
| 6,584,776 B1 | 7/2003 | Mittricker et al. |
| 2003/0033821 A1 | 2/2003 | Maisotsenko et al. |
| 2005/0056029 A1* | 3/2005 | Maisotsenko et al. ........ 62/121 |

FOREIGN PATENT DOCUMENTS

| | | |
|---|---|---|
| WO | WO 01/57459 | 9/2001 |
| WO | WO 01/57460 | 9/2001 |

OTHER PUBLICATIONS

Idalextechnologies.com Web Site, "FAQS," Jul. 31, 2002, 3 pages.

Gillan et al, Maisotsenko Open Cycle Used for Turbine Power Generation, ASME GT2003-38080, accepted Dec. 2002 for conference Jun. 16-19, 2003.

Rosen, "Evaporative Cycles—in Theori and in Practise," www Apr. 7, 2002, p: 1& 2.

Dalili, "Experimental Study on a Packed Bed Humidifier in an Evaporative Gas Turbine," IJPGC Jun. 23-26, 2002, eight pages.

Rao, "Refinery Gas Waste Heat Energy Conversion Optimization in Gas Turbines," ASME 1996, p: 473-482.

Dalili, "First Expermental Results on Humidification of Pressureized Air in Evaporative Power Cycles," IECEC'01, 2001-CT-05, Jul. 29-Aug. 2, 2001, 7 pages.

* cited by examiner

POWER SYSTEM AND METHOD

This application claims the benefit of U.S. Provisional Application No. 60/397,322; filed Jul. 20, 2002; and U.S. Provisional Application No. 60/421,754; filed Oct. 28, 2002.

BACKGROUND OF THE INVENTION

The present invention relates generally to power generation systems in which energy is extracted from a hot pressurized gas, and, more specifically, to improving efficiency thereof.

The present invention further pertains to methods and systems for producing mechanical energy or electric power in which a combustion turbine is used for conversion of the chemical energy in a fuel. This invention also relates to methods and systems for increasing the performance for gas turbines, prime movers, internal combustion engines, afterburning Ericsson cycle engines, Rankine cycles, combined cycles etc. Additionally, it pertains to new methods and systems for cooling the inlet air of gas turbines and simultaneously humidifying this air prior to combustion to increase power output and combustion efficiencies.

It is known that the operation of a turbine is thermodynamically described by the Brayton cycle, which is basically a collection of repetitive sequential energy transfer processes. A gas turbine engine generally drives the compressor stage, but it is more appropriate to think of it as an axial compressor, which is like a rotating fan of some kind. In this stage, the working gaseous fluid (air) is compressed in a series of compressor blades turned by a turbine.

The burning of fuel in the combustion section then drives the hot gases through the turbine blades and powers them. An interconnecting shaft from the compressor section through the turbine section extends out to drive a generator or pump or other mechanical rotating device.

This compression process is adiabatic, and it raises both the temperature and pressure of the compressed air. After the air is compressed, fuel is added and energy is transferred to a high temperature, high pressure gas stage because fuel burns, or because there is some kind of heat exchanger fueled by a hot source. Its temperature then rises still further, but the engine is arranged so that at the same time the volume of the gas is allowed to increase; overall, therefore, the gas remains at constant pressure.

The hot, expanded gas then enters the turbine stage where there is an adiabatic expansion of the gas against the turbine blades. This cools the gas and extracts its energy as work resulting from the transformation of the incoherent thermal motion of the hot gas into the coherent rotational motion of the blades of the turbine.

The last stage then lowers the gas temperature at constant volume via dumping heat into a sink in order to complete the cycle to achieve a viable engine. The technical difficulty of making this cycle practical requires hot and cold devices to be separated so that the turbine is kept at a high temperature while it is running.

As a thermodynamic process, it is well known that the performance of a gas turbine or internal combustion engine can be increased by cooling the air inlet, increasing its density and the air mass flowing into the engine, the compressor blades or cylinders. As the ambient temperature increases, the demand on electric utilities usually increases from air conditioning equipment while the capacity of combustion turbine decreases.

A means to overcome the high ambient temperature and decreased generation capacity is to cool the compressor inlet air. The performance of a typical industrial combustion turbine is shown in the book by William E. Stewart, "Design guide: combustion turbine inlet air cooling systems", 1999, American Society of Heating, Refrigerating and Air Conditioning Engineers, Inc., Atlanta; p. 8, FIG. 9, where the capacity of the turbine varies nearly linearly with the inlet air temperature. For example, on a 100° F. (37.8° C.) day, the capacity of a turbine at the Lincoln, Nebr. site is approximately 73 MW. Cooling the combustion inlet air to 40° F. (4.4° C.) increases the turbine output to approximately 90 MW, an increase of 17 MW, or 23%.

Some turbines may experience a 1% decrease in heat rate for every 5.5° F. (3.1° C.) of air cooling. Turbines operating at lower inlet air temperature may also have extended life and reduced combustion chamber overhauls and other maintenance.

Typically, cooling the combustion inlet air is accomplished via an evaporative cooler associated with the air inlet stream entering the compressor. This choice is due to the low capital cost to install an evaporative cooler in comparison to that of a refrigerated air system. Existing evaporative cooling using treated water is relatively inexpensive, but the decrease in inlet air temperature is limited to approaching the ambient saturated wet bulb temperature. Thereby the turbine performance increase when associated with an existing evaporative cooler is limited to the ambient wet bulb temperature of the region.

As such, evaporative cooling is most advantageous in drier climates where the required water supply is not limited. In addition, conventional evaporative coolers are wet systems with high maintenance problems associated with scaling. Such cooling has been attempted with direct evaporative coolers with cool air by adding moisture. However, as entrained moisture evaporates, dissolved salts in the water precipitate out forming entrained dust, which can erode the gas turbine parts. They are also dependent on water availability and price.

The invention described in U.S. Pat. No. 4,418,527, proposes a system for cooling and humidifying air entering a gas turbine. The air is first cooled on the dry side of an indirect evaporative heat exchanger and then moistened by a fine water spray of distilled water. This distilled water is obtained from a boiler, which is heated with excess heat from the gas turbine and condensed by the moist cool air, leaving the wet side of the indirect evaporative heat exchanger. This invention has two serious disadvantages. The temperature of the cooled air entering in the gas turbine is limited to the ambient wet bulb temperature as this air is humidified by water; consequently its density increase is small.

The design must ensure that there is no water carryover from evaporative media or cooling coils, which may have a detrimental effect on turbine blade life. Also if there is more humidity in air, there is less density and consequently less air mass flowing into the gas turbine compressor.

All known and available evaporative cooling methods and designs for cooling the inlet air of a gas turbine have one common disadvantage: the minimum temperature that may be reached is the wet bulb temperature of outside air. It cannot guarantee the efficient rejection of heat from an inlet air stream.

U.S. Pat. No. 5,790,972 describes a method and apparatus for cooling the inlet air of a gas turbine, which increases the performance of a gas turbine by cooling the air inlet below wet bulb temperature to densify the air mass flowing into the gas turbine compressor blades. But this system is very complicated and expensive. It contains three cooling coils, three water/brine chillers, three compressors, pumps, cooling tower or evaporative condenser and etc. This equipment also needs expenditure of energy for operation, and reduces the reliability of operation of the system for cooling the air inlet.

Therefore, although an existing evaporative cooler is workable and economical, particularly in low humidity areas, additional performance can be achieved by a source of lower temperature of cooling the inlet air for gas turbine without humidifying it. This is especially the case where additional gas turbine performance is achieved at temperatures below wet bulb temperature.

When a working fluid is used in an engine to produce mechanical energy or electrical power from the chemical energy contained in a fuel, the working fluid is pressurized and, following combustion of the fuel, the energy thus released from the fuel is absorbed into the working fluid as heat. The working fluid with the absorbed energy is then expanded to produce mechanical energy, which may in turn be used to drive a generator to produce electrical power.

Unconverted energy is rejected in the exhaust in the form of heat, only a portion of which may be recovered and utilized. The efficiency of the engine is at a maximum when the temperature of the working fluid entering the expansion stage is also at a maximum.

Expansion in the turbine produces the mechanical energy, and the turbine exhaust carries off the unconverted heat. The efficiency of the combustion turbine is at a maximum when the combustion temperature itself is at a maximum, and this occurs when the fuel is burned in the presence of pressurized air under stoichiometric conditions, i.e., enough air is present for complete combustion, but without any excess.

When fuel oil is burned with air under stoichiometric conditions, however, the resulting temperature is approximately 4000° F., which is in excess of the metallurgical limits of the turbine. As a result, it is necessary to utilize a large excess of air in the combustion step, which acts as a thermal diluent and reduces the temperature of the combustion products to approximately 2000° F. The necessity to use a large excess of air under pressure in turn creates a large parasitic load on the system, because compression of the air requires mechanical energy and thus reduces the net power produced from the system, as well as reducing the overall efficiency of the system.

Another disadvantage of existing combustion turbine cycles is that the pressurization step requires compression of air. Compression of a gas is very inefficient, since mechanical energy is required, which is the highest form of energy and degrades into thermal energy. The mechanical energy required for air compression can be reduced by utilizing interstage cooling, that is, by cooling the temperature of the compressed air between successive stages of a multiple stage compression process.

However, from an overall cycle efficiency standpoint, interstage cooling can be utilized advantageously if the heat removed from the compressed air in the intercooler can be efficiently recovered and utilized. If the entire heat is simply rejected to the atmosphere, the overall cycle efficiency is actually decreased, since it results in the consumption of more fuel to compensate for the energy lost through the intercooler. Accordingly, rather than simply rejecting the heat, in commercial practice, the high compressor horsepower requirement has been tolerated while containing the heat in the compressed airstream.

Even in light of the foregoing limitations, it is very desirable to use a combination turbine engine, because it is able to operate at the highest temperature of engines that use a working fluid to convert chemical energy in a fuel to mechanical energy. However, due to the high exhaust temperature that is inherent in a combustion turbine engine, the efficiency of the cycle is limited, and as a result, the exhaust from the engine is used as the heat source to operate another engine such as a steam turbine to increase the overall efficiency of utilization of the fuel. Such a system is called a combined cycle system and is widely used in the industry.

Another use for the energy contained in the combustion turbine exhaust is to raise superheated steam which is injected back into the combustion chamber of the combustion turbine, see, e.g., U.S. Pat. No. 3,978,661. Yet another method is to preheat the air leaving the compressor against the engine exhaust and simultaneously use interstage cooling during compression. These systems show higher overall efficiencies with respect to the utilization of the chemical energy contained in a fuel, but as will be explained subsequently herein, are inherently less efficient than the process of the present power system.

A combined cycle cannot take full advantage of air compressor intercooling because the temperature of the heat rejected in the air compressor intercooler is too low to be recovered for efficient use, such as for steam generation. A small portion of this heat may be recovered for boiler feed water preheating as described in U.S. Pat. No. 3,335,565 but this results in more heat being rejected with the stack gases and results in little, if any, net increase in either heat recovery or cycle efficiency.

Recently, direct water injection into the airstream as a means of intercooling has been proposed. However, there are two disadvantages with this. One is that the dew point temperature of the saturated air limits the temperature of air leaving the intercooling step. Also, by the direct injection of water into the air in the intercooler, the added water vapor which serves as a thermal diluent needs to be compressed in the successive stages after the intercooler, which precludes realizing the full advantage of water vapor substitution as a means of saving compression power.

U.S. Pat. No. 2,869,324, describes evaporation of water into the compressed air after preheating both the air and the water. However, this means of evaporation requires a higher temperature level to achieve useful moisture loading of the air because the air and water leave the evaporator in equilibrium with each other. This method of water evaporation is less efficient than the present power system, which can take advantage of air entering the saturator at low temperatures.

The steam cycle has an inherently high irreversibility since the evaporation of water (steam generation) occurs at a constant temperature, whereas the heat release occurs at varying temperatures. With steam generation, a small temperature difference between the heat source and heat absorbing fluid cannot be maintained, and this leads to a high irreversibility in the system and hence a lower efficiency. A combined cycle plant is also expensive since it requires an additional steam turbogenerator, steam drums, surface condenser for condensing steam turbine exhaust, and cooling towers to reject the heat from the surface condenser to the atmosphere.

A steam-injected cycle cannot take full advantage of air compressor intercooling for the same reasons as a combined cycle. Also this cycle involves the generation of steam and hence has the same irreversibility associated with it as described for a combined cycle, although eliminating the steam turbogenerator, surface condenser and cooling towers, and reducing the parasitic load of air compression by displacing some of the air with steam.

This is an improvement over the water-injected cycle described in NASA Report No. TR-981 titled "Theoretical Analysis of Various Thrust-Augmentation cycles for Turbojet Engines", by B. L. Lundin, 1950, where liquid water is directly injected into the combustion chamber. The injected water displaces some of the diluent air, but there is a tremendous irreversibility associated with this. The evaporation of the liquid water in the combustion chamber uses energy from the fuel at the highest temperature, which results in an overall reduction of efficiency. Also with the water-injected cycle, the heat available from the turbine exhaust still remains to be utilized.

The heat used for generation of steam in a steam-injected cycle is of a much higher quality, i.e., temperature level, than is desirable. For example, typically for a combustion turbine operating at pressure ratio of 11, the steam pressure required for injection should be at least 200 psia. The corresponding saturation temperature of the steam is 382° F. This requires that a heat source be available at much higher temperatures, for example 420° F.

In some cases, steam injection may decrease turbine capacity or increase heat rates and CO emissions. Lower inlet air temperature using a combustion turbine inlet air cooling system reduces oxides of nitrogen (NOx) emissions by lowering the combustion gas temperatures and can possibly eliminate the need for steam/water injection for NOx control.

The intercooled regenerative cycle uses intercooling during the air compression step, and compressed air preheated against the turbine exhaust before the air enters the combustion chamber. The optimum pressure ratio for this cycle is about 6 to 7. The heat released in the intercooler is all lost to atmosphere. Also the temperature of gas leaving the air preheater is around 500° F., and the heat contained in these gases is all wasted. All the thermal diluent is compressed, leading to a large parasitic load, which results in poor overall efficiency for the system.

U.S. Pat. No. 2,186,706 describes the replacement of a portion of the air for combustion with water vapor derived by directly contacting the compressed air with heated water in a humidification operation. The heat required for this humidification operation is supplied by intercoolers in the air compressor. Makeup water for the system picks up additional heat from gas turbine exhaust. The net effect of such a system is a reduction in the parasitic load of air compression and, thus, an increase in cycle efficiency.

Nakamura et al., in U.S. Pat. No. 4,537,023, describes a system similar to that of U.S. Pat. No. 2,186,706, in which an aftercooler is used for the air compressor. The aftercooler reduces the temperature of the water leaving the humidifier, which in turn allows recovery of lower level heat to a greater extent. The decrease in heat-rate resulting from the addition of the aftercooler is approximately 1.4 percent, based on the data presented in the Nakamura et al, patent.

Both systems (see U.S. Pat. Nos. 2,186,706 and 4,537,023) reject heat from the cycle through the stack gases. Rejection of heat is a consequence of the second law of thermodynamics and any power cycle converting heat to power must reject some heat. To improve the cycle efficiency, it is not only important to minimize the quantity of heat being rejected, but also, to minimize the temperature at which the heat is rejected. In both these systems, the quality of heat being rejected is solely set by the stack temperature, which constrains the cycle efficiency.

Accordingly, all known evaporative humidification processes are not effective and have limited humidity corresponding to the wet bulb temperature of outside air.

William Nebgen (see U.S. Pat. No. 3,877,218) describes Brayton Cycle Systems with Refrigerated Intake and Condensed Water Injection, which increases the performance of gas turbine by cooling the inlet air of the compressor with a vapor compression refrigeration system and injecting condensed water from the system into the air before combustion. This system contains an air compressor, a combustion chamber, a gas turbine and also a conventional refrigerating system with refrigerant evaporation and condensation. The disadvantages of this system are big cost and greater consumption of the energy.

The output of gas turbines can be enhanced using low-pressure steam (see U.S. Pat. No. 5,241,816). Pumped water circuit and water contact towers are used to achieve desired gas humidification using such low-pressure steam. But this humidification process only for gases cannot significantly increase power output and combustion efficiencies.

The present power system also relates to methods for increasing the performance not only for gas turbines but also for internal combustion engines, or external combustion engines, for example afterburning Ericsson cycle engines. An example of the internal combustion approach is the "Afterburning Ericsson Cycle Engine" disclosed in U.S. Pat. No. 5,894,729.

The heat engine operates on the afterburning Ericsson cycle, whose principle is heat addition to the cycle by an afterburner in which fuel is burned with the low-pressure air working fluid exhausted by the expander. The resulting combustion gases are used in a countercurrent heat exchanger continually heating the air expanding in the expander. But using this generator it is impossible to realize processes for cooling the inlet air of a compressor and simultaneously humidifying this air prior to combustion to increase their power output and combustion efficiencies.

U.S. Pat. No. 4,829,763 describes producing mechanical energy or electric power from chemical energy contained in a fuel, utilizing a combustion turbine. The compressed air, which is used for combustion of the fuel to drive the turbine, is humidified prior in a multistage saturator to replace some or all of the thermal diluent air with water vapor. Humidification of the compressed air increases the mass flow through the gas turbine and thereby raising the power output. Humidification is effected with the water at a temperature below its boiling point at the operating pressure. The compressed air is cooled prior to humidification by passing in heat exchange relationship with the water used for humidification. This process provides an improvement in thermal efficiency, compared to conventional cycles.

But this improvement is not much, and the known process for producing power has a lot of disadvantages:

1. The known system doesn't provide the means for humidifying the compressed air in a thermodynamically efficient manner and consequently cannot guarantee a high level of moisture for this air, using heat from stack gas from a turbine.
2. The known system doesn't provide the means for cooling the inlet air to the compressor of a gas turbine (especially below the wet bulb temperature as it approaches the dew point temperature without adding humidity) to increase their power output and combustion efficiencies.
3. Process of rejecting heat from compressed air during intercooling and just prior to humidification is not efficient, leading to a large parasitic load, which results in poor overall efficiency for the system.
4. The known system which realizes this process for producing power is very complicated and expensive. It contains a lot of pumps and apparatuses, where heat and mass exchange processes are realized but with poor efficiency.

5. The known system cannot provide simultaneous cooling process for the inlet air before an air compressor, and humidifying process for the same airstream before a combustion chamber of the Brayton cycle.
6. Management of water migration within the known system is realized but with poor efficiency and with a very complicated design.
7. The known system does not provide for efficient cleaning of stack gas from a turbine before its removal to the atmosphere.

Using the known methods and designs, it is impossible to realize efficiently and economically all these useful actions simultaneously, and this decreases productivity of the known methods and systems for producing power.

Accordingly, it is desired to provide methods and systems for producing power resolving one or more of the aforementioned drawbacks.

BRIEF SUMMARY OF THE INVENTION

A power system includes a device for extracting energy from a hot gas stream to power a driveshaft. An evaporative duplex counterheat exchanger is disposed in flow communication with the energy extracting device. The duplex exchanger includes a first heat exchanger having a first main flow channel, and a counterheat channel joined in flow communication therewith. A second heat exchanger includes a second main flow channel adjacent the counterheat channel. And, an evaporative fluid is injected into the counterheat channel to evaporatively cool the flow through both main flow channels.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
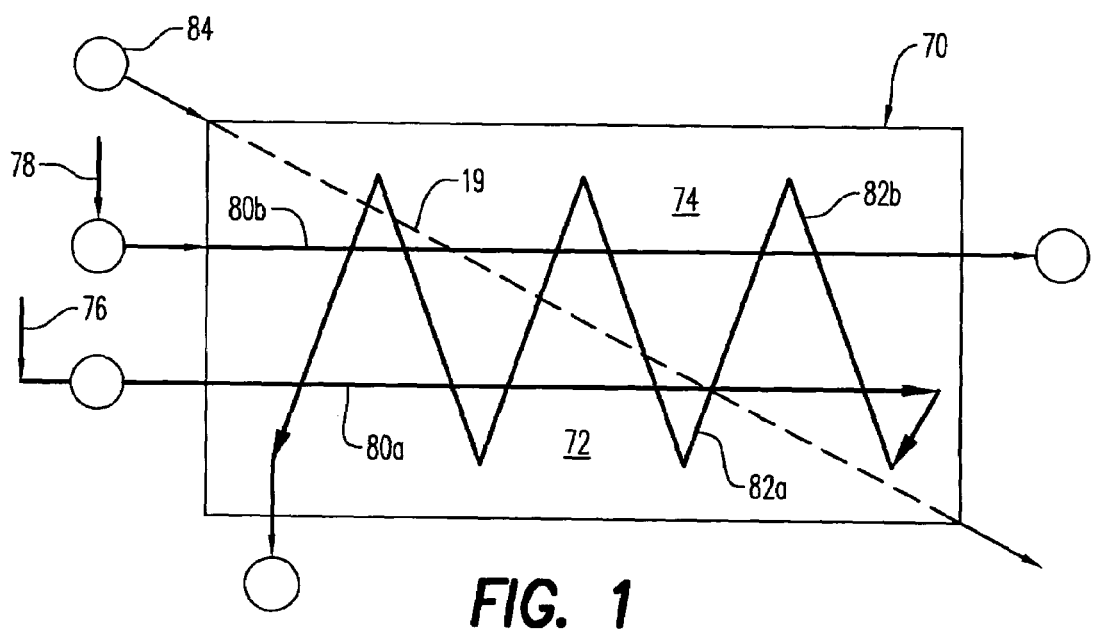
FIG. 1 is a schematic representation of an evaporative duplex counterheat exchanger.

Illustrated schematically in FIG. 1 is an evaporative duplex counterheat exchanger 70 including cooperating first and second heat exchangers 72,74 in a suitable frame or enclosure. A first main flow 76 is suitably channeled through the first heat exchanger, and a second main flow 78 is independently channeled through the second heat exchanger.

The first heat exchanger 72 includes a first main flow channel 80a for channeling the first main flow 76 therethrough. A first counterheat flow channel 82a is joined in flow communication with the discharge end of the first main channel 80a.

The second heat exchanger 74 includes an independent second main flow channel 80b for channeling the second main flow 78 therethrough. A second counterheat flow channel 82b is located adjacent to the second main channel 80b.

The discharge end of the first main channel 80a is disposed in flow communication with the counterheat channels 82a,b which oppose the corresponding two main channels 80a,b. Means 84 are provided for injecting an evaporative fluid, such as water 19, into one or both counterheat channels 82a,b during operation. The injecting means may have any conventional form for suitably injecting or dispensing or spraying or wicking or otherwise introducing the evaporative fluid into the counterheat channels for cooperating with the first main flow stream 76 discharged into the counterheat channels from the first main channel 80a.

In conventional heat exchangers, opposing flows of different temperature are suitably channeled adjacent to each other for permitting heat transfer from the hotter flow to the cooler flow. Heat transfer continues providing the differential temperature between the two flows is maintained by channeling the two flows in countercurrent opposition or counterheat to each other. Such counterheat is typically effected by introducing counterflow in any suitable direction opposite to the direction of the main flow, and is typically oblique thereto in serpentine fashion, with a corresponding amount of lateral crossflow. In other embodiments, counterheat may be introduced by lateral crossflow alone.

In the duplex exchanger 70 illustrated in FIG. 1, the initially hot first main flow 76 is cooled as it travels along the length of the first main channel 80a by evaporative cooling occurring in the counterheat channel 82a. The main flow is discharged from the first main channel 80a into the first counterheat channel 82a wherein the evaporative fluid is introduced and evaporated by the heat contained in the first main flow. Evaporation correspondingly removes heat from the main flow for providing evaporative cooling thereof.

Correspondingly, the evaporative fluid is also introduced in the second counterheat channel 82b which is arranged in opposition to the second main channel 80b. In this way, the second main flow 78 is concurrently evaporatively cooled by evaporation of the water introduced into the counterheat channel.

A particular advantage of the duplex exchanger illustrated in FIG. 1 is that the first main flow 76 may be cooled significantly below its wet bulb temperature towards its dew point temperature, and concurrently the second main flow 78 is corresponding cooled towards the dew point temperature of the first main flow.

Since the second main flow channel 80b is independent from the first main flow channel and from the counterheat channels, the second main flow 78 channeled therethrough is not only cooled, but remains relatively dry without the addition of the evaporative fluid therein. Correspondingly, the first main flow 76 channeled through the counterheat channels is suitably saturated or humidified by the evaporative fluid as its heat increases prior to discharge from the duplex exchanger. Furthermore, condensation of the evaporative fluid near the discharge end of the first main channel 80a will be relatively cold due to the evaporative cooling in this region, and may also be discharged from the duplex exchanger as a relatively cold condensate.

Accordingly, the duplex exchanger 70 illustrated in FIG. 1 provides enhanced dew point indirect evaporative cooling of both main flows being channeled concurrently through the two main flow channels 80a,b to a temperature approaching the dew point temperature of the first main flow. And, the duplex exchanger also permits discharge of saturated first main flow, and relatively cold condensate for use in various systems to advantage.

The duplex counterheat exchanger illustrated in FIG. 1 is disclosed in preferred embodiments in U.S. Pat. No. 6,581,402. Additional embodiments of this duplex counterheat exchanger are disclosed in U.S. Pat. No. 6,497,107, both incorporated herein by reference.

In these two references, the duplex exchanger is configured as a dew point indirect evaporative cooler for air conditioning environmental air. The cooler is configured with stacked plates, including configurations having perforations therein for bypassing a portion of the first main flow into the counterheat or crossflow channels disclosed therein.

Figure 2:
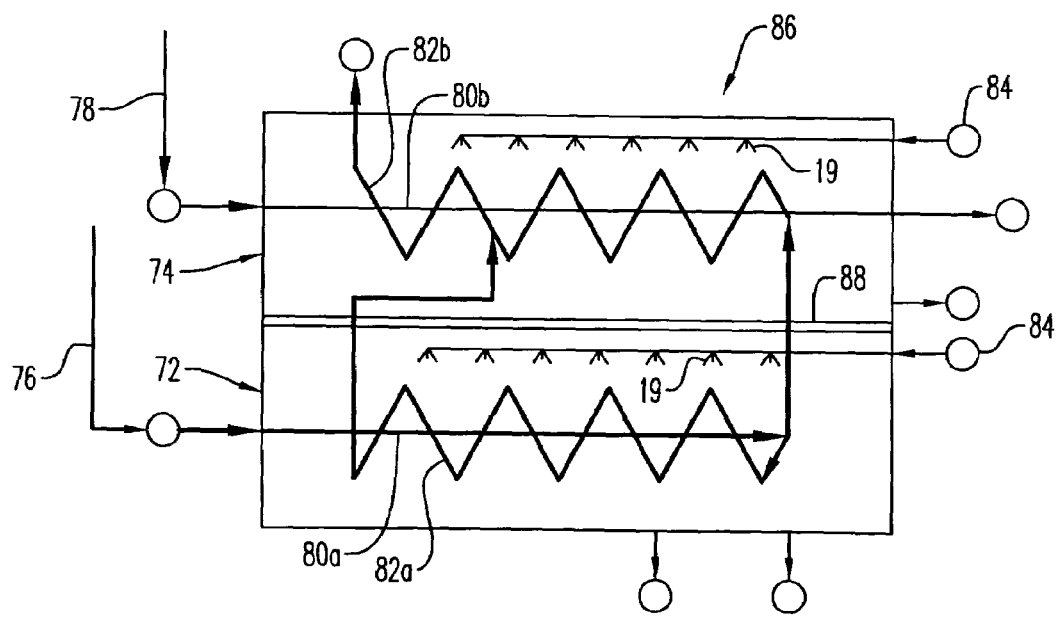
FIG. 2 is a schematic representation of the duplex exchanger illustrated in FIG. 1 in accordance with another embodiment.

FIG. 2 illustrates a further embodiment of another evaporative duplex counterheat exchanger, designated 86, which may be used for high pressure applications as a humidifier or saturator in a preferred embodiment. The duplex exchanger 86 may be constructed in tube-in-shell configurations or plate designs for suitably introducing therein the two main flow channels 80a,b and the cooperating counterheat channels 82a,b in a manner thermodynamically similar to the generic exchanger 70.

The counterheat channels 82a,b illustrated in the FIG. 1 embodiment are common in configuration and defined by the wet-side space or gap formed between stacked heat exchange plates in which lateral crossflow is effected relative to the main flows. In the FIG. 2 configuration, the two heat exchangers 72,74 may be physically separated from each other in most part by an intervening septum 88 which interrupts the physical continuity of the two counterheat channels 82a,b and permits primarily only counterflow relative to the main flows, with some lateral crossflow as the wet-side flow serpentines back in opposition or countercurrent to the main flows. However, the two counterheat channels nevertheless receive flow from the common end of the first main flow channel 80a.

In this way, the first main flow 76 is split at the discharge end of the first main channel 80a, with a first portion thereof being suitably channeled through the corresponding first counterheat channel 82a, and a second portion thereof being suitably channeled to the inlet end of the second counterheat channel 82b.

The two split discharge portions from the first main channel 80a separately flow through the corresponding first and second counterheat channels 82a,b in counterflow opposition to the corresponding first and second main channels 80a,b for correspondingly cooling the flows therein by evaporation of the water 19 injected or introduced into the counterheat channels.

The discharge end of the first counterheat channel 82a is suitably joined in flow communication near the corresponding outlet end of the second counterheat channel 82b for rejoining together the two split streams. Humidity is added to the first main flow in both counterheat channels as the main flow is reheated in the counterheat channels as it cools the corresponding flows in the two main channels.

The split counterheat or counterflow duplex exchanger 86 illustrated in FIG. 2 is therefore useful for efficiently humidifying or saturating the first main flow 76 as the second main flow 78 is simultaneously cooled.

Both embodiments of the duplex exchanger 70,86 illustrated in FIGS. 1 and 2 similarly operate under the Maisotsenko Cycle for effecting dew point indirect evaporative cooling of both main flow channels, with corresponding structural differences as required for the low or high pressure applications. The duplex exchanger 70 shown in FIG. 1 is generic, and the duplex exchanger 86 shown in FIG. 2 is a species thereof.

In both configurations, the duplex exchangers operate for cooling the corresponding first main flows 76 below the wet bulb temperature thereof and toward the dew point temperature thereof for enhanced cooling capability. The enhanced cooling in the duplex exchanger 86 additionally enhances the ability to humidify or saturate the first main flow 76 to any desired amount for discharge from the two counterheat channels 82a,b for advantageous use.

Figure 3:
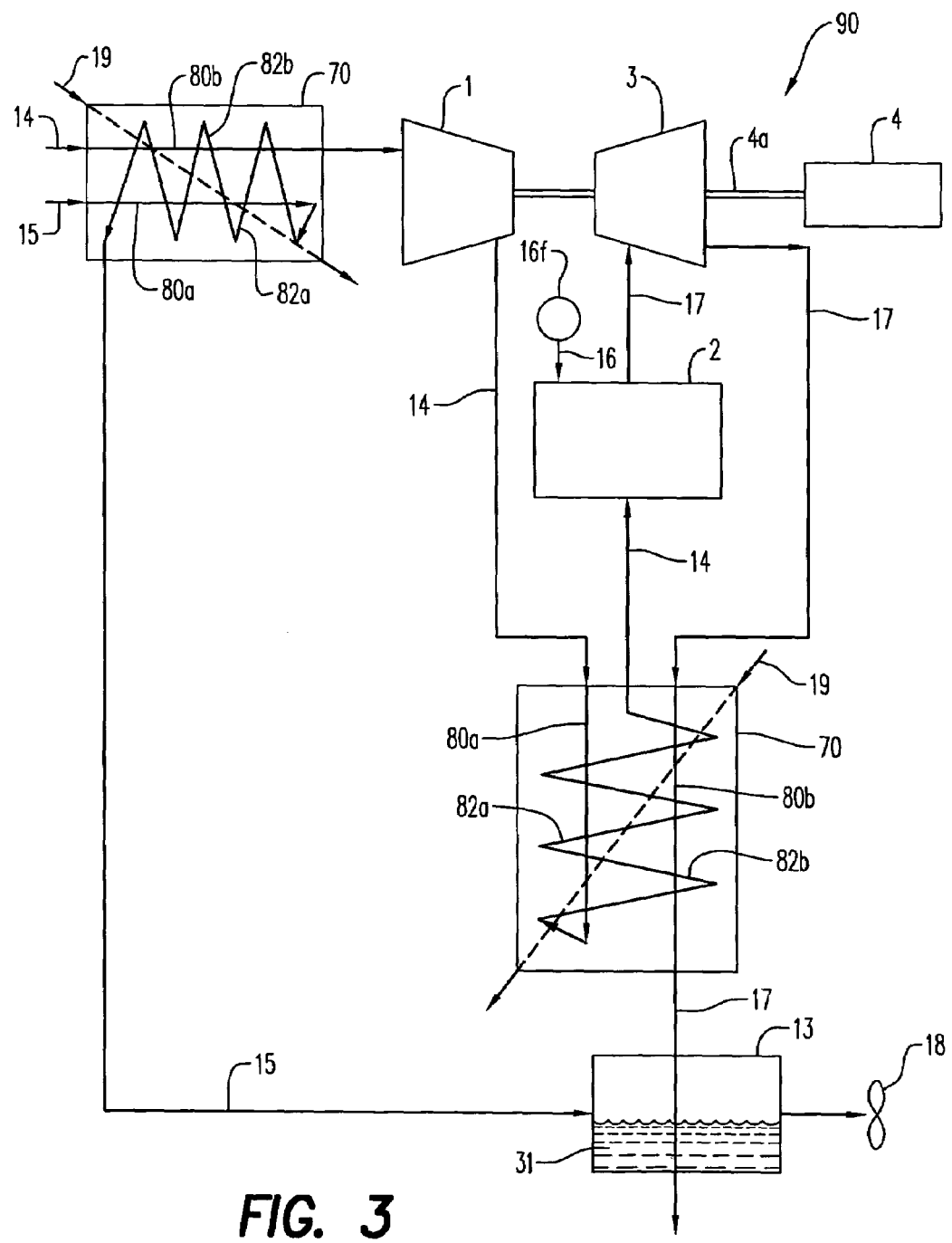
FIG. 3 is a schematic representation of two duplex exchangers joined in flow communication with a gas turbine power system having an air compression stage.

For example, FIG. 3 illustrates schematically an exemplary power generation system 90 in which two of the duplex exchangers 70 are used for enhancing efficiency and performance. The power system includes an air compressor 1 joined in serial flow communication with a combustor or combustion chamber 2 and a gas turbine 3. The compressor and turbine are suitably joined to an electrical generator 4 by a driveshaft 4a therefor.

The turbine 3 defines an exemplary means for extracting energy from the hot gas stream expanded therein to power the driveshaft 4a. Other exemplary forms of the extracting means include internal combustion engines, external combustion engines, and described hereinbelow are steam turbine and expansion cylinder examples.

The compressor, combustor, turbine, other forms of energy extracting means, and generator may have any conventional configuration. In typical operation, ambient air 14, or product air, is pressurized in the compressor 1 and suitably channeled to the combustor 2 wherein it is mixed with fuel 16, such as natural gas, injected therein by suitable fuel injectors 16f. The compressed air and fuel mixture is suitably ignited for generating hot combustion gases 17 which flow through the turbine 3 and are discharged therefrom as hot exhaust or stack gas.

The compressor may have one or more stages in axial or axicentrifugal blade form, or using reciprocating piston(s). The combustor may have one or more combustion chambers, and is suitably configured for burning various fuels.

The turbine 3 may have one or more stages and one or more rotors or spools having rotor blades for extracting energy from the combustion gases 17 by expansion thereof. Expansion of the combustion gases rotates and powers the turbine blades for in turn powering the driveshaft 4a which rotates the rotor of the generator 4 for producing electrical power in an exemplary application.

The efficiency of the turbine system 90 is based in large part on efficient compression of the air, coupled with efficient combustion of the air mixed with fuel for producing the combustion gases from which energy is extracted by the turbine. The air discharged from the compressor is relatively hot due to the compression heating thereof and has a corresponding temperature, pressure, and density upon entering the combustor.

The efficiency of the turbine system 90 illustrated in FIG. 3 may be increased by introducing therein a first evaporative duplex counterheat exchanger 70 of the general type illustrated in FIG. 1, which includes the specific type exchanger 86 additionally illustrated in FIG. 2. This first duplex exchanger 70 is specifically joined in flow communication with the turbine 3 for enhancing performance thereof in an exemplary configuration.

The first main channel 80a is joined in flow communication with the discharge end of the compressor 1 for receiving the hot pressurized air therefrom as product air flowing as the first main flow therethrough. The second main flow channel 80b is suitably joined to the discharge end of the turbine 3 for receiving the relatively hot exhaust or stack gases 17 therefrom for flow therethrough as the second main flow. In this way, the first and second main channels 80a,b are disposed in concurrent or co-direction parallel flow in the first duplex exchanger for separately channeling the hot product air 14 and the hot stack gas 17 therethrough.

The cooperating counterheat channels 82a,b of the first duplex exchanger are disposed in counterheat or counterflow opposition to the two main flow channels 80a,b for evaporatively cooling the product air 14 and stack gases 17 channeled therethrough. The evaporative water fluid 19 is suitably injected into the first duplex exchanger for being evaporated in the hot product air 14 channeled through the counterheat channels 82a,b.

The two main flow channels 80a,b are independent from each other and from the cooperating counterheat channels 82a,b for maintaining dry the product air 14 and the stack gas 17 being channeled therethrough, without the addition of moisture therein. Correspondingly, the counterheat channels 82a,b are disposed in counterheat opposition to the first and second main flow channels 80a,b for wetting or humidifying the product airflow 14 discharged from the first main channel 80a to evaporatively cool both first and second main channels 80a,b, and the flows being channeled therethrough.

A particular advantage of using the duplex exchanger between the compressor 1 and turbine 3 is the ability to humidify or saturate the pressurized product air 14 prior to combustion in the combustion chamber 2. The heat of compression in the product air 14 and residual heat in the stack gas 17 discharged from the turbine 3 are used to advantage in the duplex exchanger for evaporatively cooling these flows by the introduction of the evaporative fluid water 19. In this way, inherent heat in the turbine system is utilized for introducing water vapor or mass to the product air 14 prior to combustion, thereby decreasing the density of the combustion gases 17 for increasing the power output from the turbine 3.

The inherent humidifying capability of the duplex exchanger 70 illustrated in FIG. 1 may therefore be used to advantage in the power system illustrated in FIG. 3. The first duplex exchanger 70 illustrated in FIG. 3 may be effected with conventional components suitable for the high pressure and temperature application of the power system. In one embodiment, the counterheat channels 82a,b may be disposed in lateral crossflow with the cooperating first and second main flow channels 80a,b.

In another configuration, the first duplex exchanger used in the power system of FIG. 3 may be in the form of the duplex exchanger 86 illustrated in FIG. 2 in which the counterheat channels 82a,b are disposed in counterflow with the corresponding first and second main flow channels 80a,b.

In the exemplary power system illustrated in FIG. 3, a second evaporative duplex counterheat exchanger 70 is also joined in flow communication with an inlet of the compressor 1 for providing precooled air thereto. The second duplex exchanger 70 may also be configured with conventional components, and is suitably joined to the compressor inlet for providing precooled air thereto in the manner disclosed in the above references corresponding thereto.

For example, the second main channel 80b of the second duplex exchanger is joined in flow communication with the compressor inlet for channeling thereto the ambient product air 14. Additional ambient air, used as working air 15, is channeled through the first main channel 80a and is then discharged through the counterheat channels 82a,b in which is injected the water 19 for evaporation thereof. The evaporating water cools both inlet product air 14 and working air 15 towards the dew point temperature of the inlet air.

The product air 14 is therefore effectively precooled prior to entering the compressor 1, which increases the density of the compressor inlet air and thereby increases the efficiency of compression in the compressor. The humidified working air 15 may be discharged from the counterheat channels 82a,b for any suitable purpose, such as use in a conventional gas cleaner 13 which receives the stack gas 17 from the first duplex exchanger while condensing water vapor from the humidified product air 15 to form condensate liquid 31.

The two duplex exchangers 70 illustrated schematically in FIG. 3 may have any suitable configuration for their cooling and humidification use in the power system. For example, the first duplex exchanger 70 receives pressurized product air 14 from the compressor 1 and therefore requires corresponding high pressure capability which may be conveniently introduced in the tube-in-shell configuration of the split counterflow exchanger embodiment 86 illustrated in FIG. 2.

Figure 4:
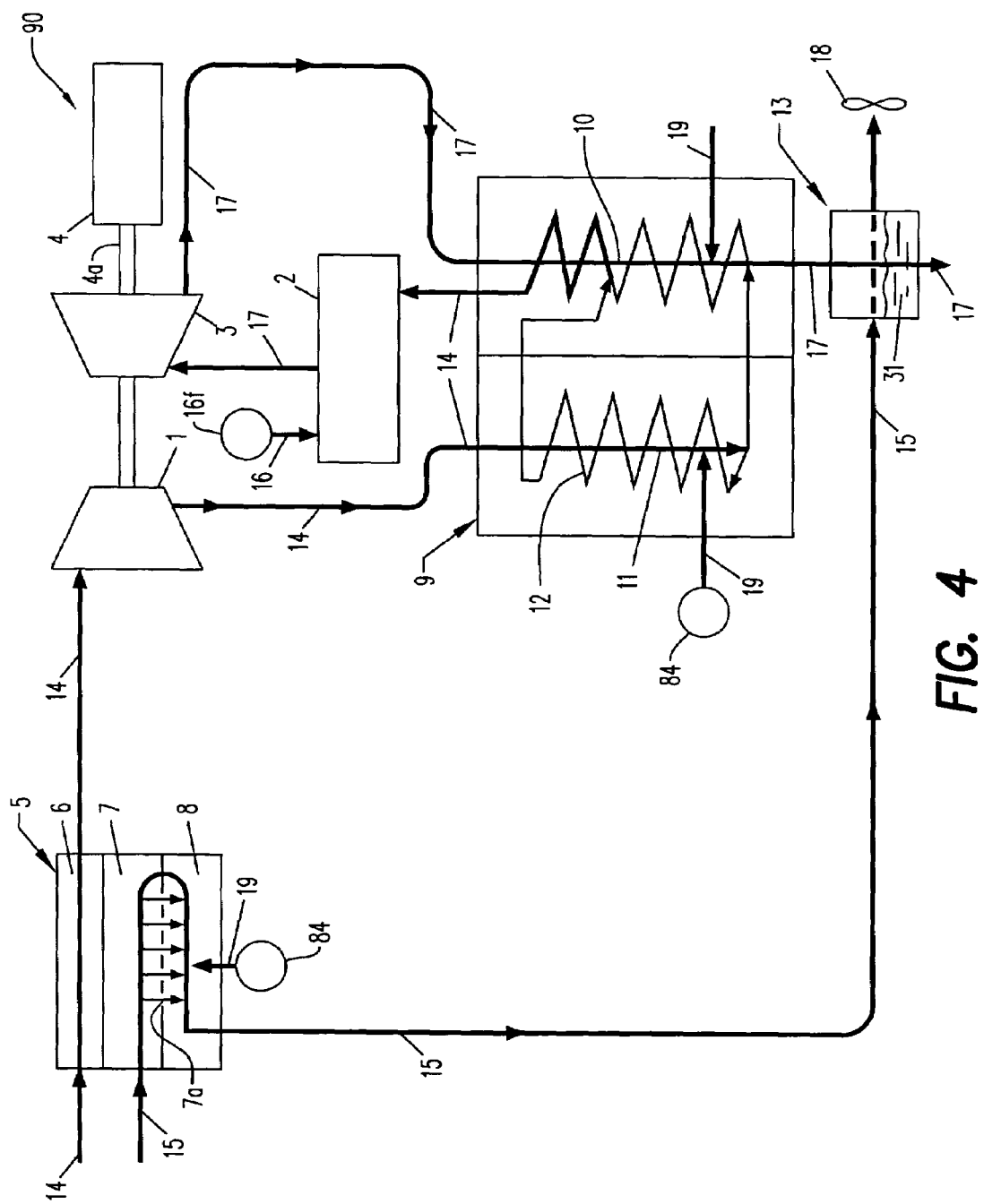
FIG. 4 is a schematic representation, like FIG. 3, with two duplex exchangers cooperating with a compressor and combustor in a gas turbine power system in another embodiment.

This configuration is illustrated schematically in FIG. 4 in which the split counterflow heat exchanger 86 illustrated in FIG. 2 is joined in flow communication with the discharge end of the compressor 1, and designated as the humidifier 9 for its corresponding function in this configuration. The first main flow channel 80a of FIG. 2 is identified in FIG. 4 as a dry channel 11 for its capability if channeling the product air 14 therethrough without the addition of moisture. The second main flow channel 80b of FIG. 2 is identified in FIG. 4 as the product channel 10 through which the stack gas 17 is channeled.

The counterheat channels 82a,b illustrated in FIG. 2 are independent portions separated by the septum 88 and are disposed adjacent to their corresponding first and second main channels 80a,b. In the FIG. 4 embodiment, the counterheat channels 82a,b are commonly designated as the wet channels for their function of evaporatively cooling the product and dry channels by the introduction of the evaporative water 19. The wet channels 12 are commonly joined in split flow communication with the discharge end of the first main flow channel or dry channel 11 for receiving the cooled, dry, pressurized product air 14 therefrom.

Like the FIG. 2 embodiment, the humidifier embodiment 9 illustrated in FIG. 4 includes the counterheat or wet channels 12 with a first portion disposed in counterflow with the first main flow dry channel 11, and a second portion disposed in counterflow with the second main flow product channel 10.

Correspondingly, the second duplex exchanger 5 illustrated in FIG. 4 is identified as the cooler for its use in precooling the ambient air to the inlet side of the compressor 1 in contrast to the use of the first duplex exchanger used as the humidifier 9 on the outlet side thereof. The cooler 5 is operated at relatively low atmospheric pressure as opposed to the high pressure operation of the humidifier 9, and therefore may have a suitable configuration for this low pressure application, including the various plate designs disclosed above or in the two references identified above.

For example, the first main channel 80a in the FIG. 1 embodiment is identified in FIG. 4 as the dry channel 7 of the cooler 5. The second main channel 80b is identified in the cooler 5 as the product channel 6. And, the counterheat channels 82a,b are identified in the cooler 5 as the common wet channel 8. The counterheat, or wet channel 8 preferably extends in common between the two main flow product and dry channels 6,7 in common flow communication with the discharge end of the dry channel 7.

In the low pressure, plate configuration of the cooler 5 illustrated in FIG. 4, the dry channel 7 preferably includes a series of perforations 7a for providing intermediate flow communication with the wet channel 8. This configuration of the cooler 5 may be similar to those disclosed in the two references identified above.

FIGS. 3 and 4 similarly illustrate an exemplary gas turbine power system 90 in which the two duplex exchangers in the form of the cooler 5 and humidifier 9 may be used for increasing efficiency thereof by precooling the product air 14 to the compressor 1 without the addition of moisture or humidity thereto, while also introducing moisture or humidity to the pressurized product air 14 discharged from the compressor 1 prior to entering the turbine. In this configuration, the humidifier 9 is disposed in flow communication with the exhaust outlet of the turbine 3 for receiving the exhaust flow or stack gas 17 therefrom. In particular (11) the second main flow channel identified as the product channel 10 is disposed in flow communication with the turbine outlet.

The power system illustrated in FIG. 4 may be used to advantage in an improved method in which the hot pressurized product air 14 is channeled through the turbine 3 for extracting energy therefrom to power the driveshaft 4a. The exhaust flow or stack gas 17 discharged from the turbine is channeled through the second main flow channel or product channel 10 of the humidifier 9.

Correspondingly, the hot pressurized product air 14 from the compressor 1 is channeled through the first main flow channel or dry channel 11 of the humidifier 9. Water 19 is suitably injected into the wet channel 12 for saturating the product air 14 flowing therethrough, and cooling both the product air 14 in the dry channel 11 as well as the exhaust flow 17 channeled through the product channel 10. Preferably, the product air is evaporatively cooled below the wet bulb temperature thereof towards its dew point temperature.

In this way, the product air 14 may be humidified in the humidifier 9 and is charged from the wet channel 12 thereof into the turbine 3 via the combustion chamber 2 wherein it is first mixed with fuel 16 and burned for generating the hot combustion gases 17 channeled through the turbine. The combustion gases 17 therefore have added mass due to the humidification or saturation of the compressed product air 14 for increasing efficiency of operation of the turbine 3, and increasing power from the power system.

As indicated above, FIG. 4 is a schematic depiction of a method and system for producing power in one preferred embodiment utilizing the one-stage air compressor 1 axially coupled to the gas turbine 3. The combustion chamber 2 produces hot combustion gases discharged to the turbine 3 which powers the electrical generator 4. Reference numeral 5 indicates the second duplex exchanger configured for dew point indirect evaporative cooling as a cooler, which contains: product channels 6, dry working channels 7, and wet working channels 8. Reference numeral 9 indicates the first duplex exchanger for dew point indirect evaporative cooling as a humidifier, which contains: product channels 10, dry working channels 11, and wet working channels 12. The gas cleaner 13 is joined to the product channel 10 for cleaning the exhaust flow 17 therefrom.

Product air 14, working air 15, exhaust stack gas 17, and water 19 are used in the cooler 5 and humidifier 9. Fuel 16 is mixed with the compressed air 14 in the combustor 2 for generating the hot combustion gases 17 from which energy is extracted in the turbine, with the exhaust or stack gas being discharged therefrom to the gas cleaner. An electrical fan 18 draws flow through the gas cleaner.

As indicated above, the power system 90 shown in FIGS. 3 and 4 includes two evaporative duplex counterheat exchangers in the form of similar dew point indirect evaporative cooling devices: one as the cooler 5, and another as the humidifier 9, each of which contains the product channels 6 and 10 and cooperating dry 7 and 11 and wet 8 and 12 working channels respectively.

Outside airstream as product air 14 is directed for cooling to the product channels 6 of the cooler 5. Here this airstream 14 is cooled below the wet bulb temperature and approaches the dew point temperature without adding humidity by passing its stream 14 through the product channels 6 of the cooler apparatus 5 for dew point indirect evaporative cooling. One example of this apparatus is described in detail in the U.S. Pat. No. 6,581,402 and U.S. Pat. No. 6,497,107.

Simultaneously outside airstream as the working air 15 is directed at first to the dry 7 and next wet 8 working channels of the cooler 5. The working airstream 15 is passed through the dry working channels 7, which are residing alongside the product channels 6 but not in contact therewith. The product channels 6 and dry working channels 7 are separated by a waterproof, dry side of a heat exchange surface, from the opposing wetted side using a suitable water distribution system 84 for injection or introduction of the water 19.

This wetted surface creates the wet working channels 8, which are connected with the dry working channels 7 by, for example, the perforations 7a on heat exchange surface. The working airstream 15 is redirected from the dry working channels 7 through, for example, a plurality of perforations into and through the wet working channels 8, where its moisture increases. Hereafter this moist working airstream 15 is transferred to the gas cleaner 13 for direct contact with the hot exhaust or stack gas 17, and/or to the generator 4 for its cooling. The fan 18 is used for transportation of the working airstream 15.

After passing through the product channels 6 of the cooler 5 cold product airstream 14 is sucked by air compressor 1, which discharges this airstream 14 at first to the dry 11 and next wet 12 working channels of the humidifier 9. Both the humidifier 9 and the cooler 5 utilize similar features for effecting dew point indirect evaporative cooling, and therefore have similar designs including the product channels and the dry and wet working channels.

Passing through the wet working channels 12 of the humidifier 9, the product airstream 14 increases its moisture additionally using rejected heat from the hot stack gas 17, which is directed from the turbine 3 to the product channels 10 of the humidifier 9. After the humidifier 9, the moist airstream 14 is directed for admixture with fuel 16 in the combustion chamber 2, where this mixture is burned, and then it is directed to the gas turbine 3. Thereafter the hot combustion stack gas 17 from turbine 3 is directed to the product channels 10 of the humidifier 9 and after that it is directed to the gas cleaner 13.

As can be seen from FIG. 4, using two apparatuses for dew point indirect evaporative cooling as the cooler 5 and as the humidifier 9 offers the possibility to reduce temperature of the product airstream 14 before the compressor 1 and simultaneously increase humidity of the working air 15 in the cooler 5. In the humidifier 9 this offers the possibility to reduce temperature of stack gas 17 and simultaneously increase humidity of the product airstream 14 before its coming to the combustion chamber 2.

The working airstream 15 is effectively precooled in the cooler 5 as it moves down the dry working channels 7 by the same working airstream 15 passing through to the wet working channels 8 and evaporating the moisture present. As the working airstream 15 is precooled in the dry working channels 7 its wet bulb temperature continually drops approaching the dew point temperature of the entering working airstream 15.

This cooled working airstream 15 may then pass through, for example, perforations 7a in the wet working channels 8 in heat exchange contact with the dry working channels 7 and product channels 6 absorbing heat from the product airstream 14 and causing additional evaporation. As a result of this contact the product airstream 14 is cooled below the wet bulb temperature and approaches the dew point temperature without adding humidity. Simultaneously the working airstream 15 increases its absolute humidity and approaches a condition of saturation close to the temperature of the outside air, but always lower. Thereby the cold and dry product air 14 increases density in the cooler before its inlet to the compressor 1, and the working airstream 15 has more humidity, which is useful for the gas cleaner 13 and/or for a generator 4.

Because the processes of cooling and humidifying the streams which are passing through the product channels 6,10 and dry 7,11 and wet 8,12 working channels in the cooler 5 and humidifier 9 are the same, the results for these processes in the humidifier 9 will be similar. Stack gas 17, after passing through the product channels 10 of the humidifier 9, reduces its temperature below the wet bulb temperature and approaches the dew point temperature of the compressed air 14.

It helps to condense some polluting components (condensate 31) of this stack gas 17 and improve its cleaning. But particularly important is the humidifying process for the product airstream 14 when it is passing through at first to the dry 11 and next wet 12 working channels of the humidifier 9. This humidifying process for the product airstream 14 is very efficient because heat rejection from stack gas 17 additionally increases its moisture and consequently it increases the mass flow through the gas turbine 3 and thereby raises the power output.

Figure 5:
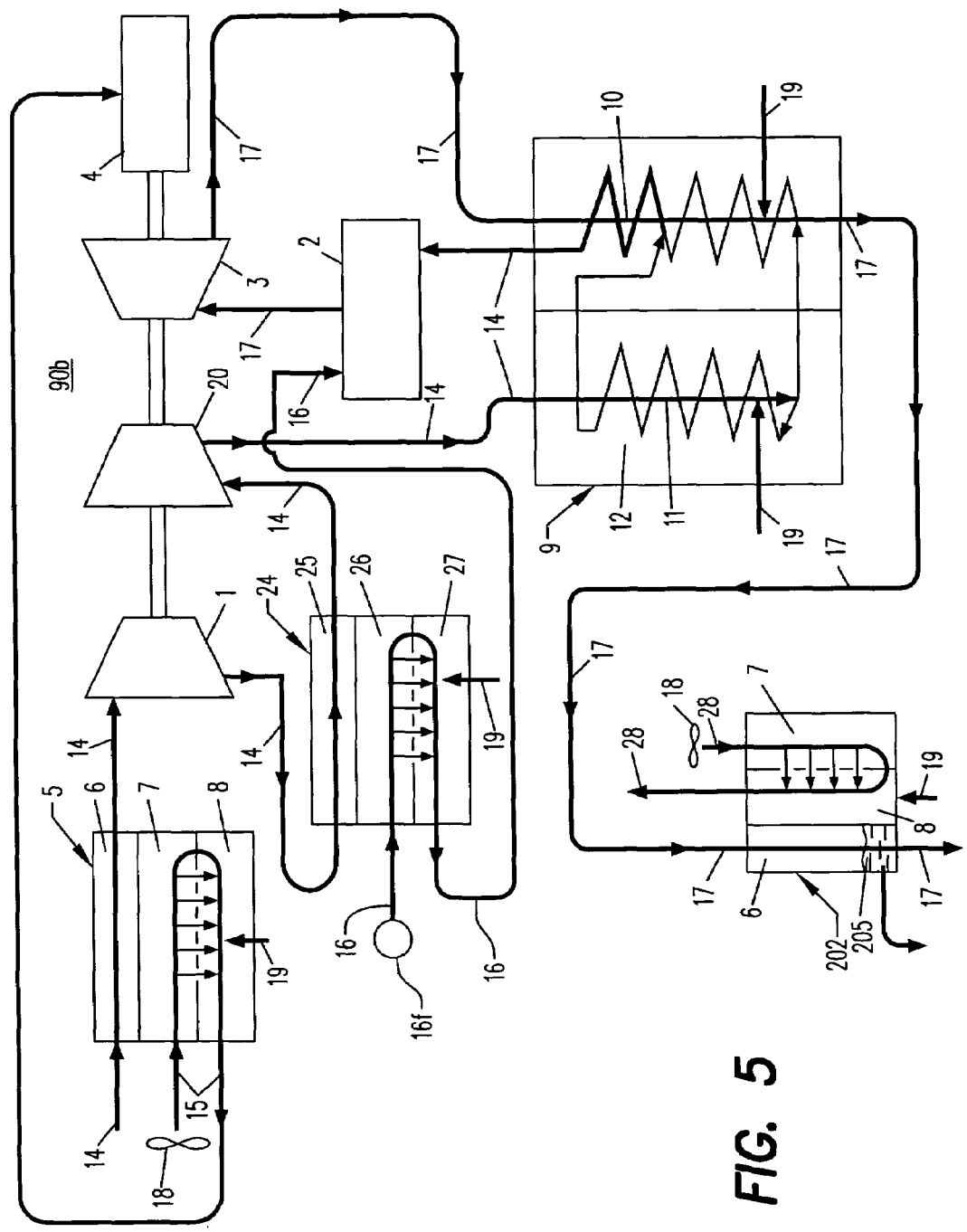
FIG. 5 is a schematic representation, like FIG. 4, including two stages of compression in the gas turbine power system, and cooperating four duplex exchangers.

In some cases, when the fuel stream 16, such as natural gas, has low humidity it is desirable to humidify this fuel 16 for improvement of burning conditions, fuel stream 16 instead of the working outside air 15 is directed at first to the dry 26 and next wet 27 working channels of another evaporative duplex counterheat exchanger 24, as shown in the modified power system 90b of FIG. 5. Thereafter this moist fuel stream 16 is transferred to the combustion chamber 2 for burning. Increasing humidity of the fuel stream 16 helps the burning process in combustion chamber 2, reduces oxides of nitrogen (NOx) emissions, and increases the mass flow through the gas turbine 3 and thereby raises the power output.

FIG. 5 is a schematic depiction of the method and system 90b for producing power utilizing a two-stage air compressor, instead of the one-stage compressor in the FIG. 4 embodiment. In FIG. 5, the additional evaporative duplex counterheat exchanger 24 also uses dew point indirect evaporative cooling, and similarly includes product channels 25, dry working channels 26, and wet working channels 27. And, yet another evaporative duplex counterheat exchanger configured as a condenser 202 is also integrated in the power system.

Outside air 28 is again used as the working air for this condenser 202, driven by fan 18. The condenser also effects dew point indirect evaporative cooling for condensation of water vapor 205 from stack gas 17, after it passes through the product channel 10 of the humidifier 9.

The power system 90b utilizes a two-stage air compressor having a first stage compressor 1 and a second stage compressor 20. If the Brayton cycle is used with multistage air compressor as two stages 1 and 20, interstage cooling is desirable between compression stages. Interstage cooling increases density of airstream 14 and improves the characteristics of the compressor. Moreover using heat of the compression of the air compressor for additionally humidifying the product air 14 in the humidifier 9, before its passing to the combustion chamber 2, brings additional increase in the mass flow through the gas turbine 3 and thereby raises the power output.

Low level heat is usually rejected from compressed air during intercooling using a conventional heat exchanger, but instead of using a conventional heat exchanger, the additional cooler 24 is preferably used for interstage cooling, which again operates on dew point indirect evaporative cooling like cooler 5. It helps to cool the product airstream 14 in the additional cooler 24 during its passing through the product channels 25 below the wet bulb temperature and approaching the dew point temperature without adding humidity for the product airstream 14 after the first stage 1 of the compressor and before being sucked into the second stage 20.

The system 90b for producing power shown in FIG. 5 works as follows. The cold product airstream 14, after its passing through the product channels 6 of the cooler 5, is sucked by the first stage 1 of the compressor. Simultaneously outside airstream as a working air 15 is directed at first to the dry 7 and next wet 8 working channels of this cooler 5 using the fan 18. Hereafter the cool product airstream 14 from the compressor first stage 1 is directed via the product channels 25 of the additional cooler 24 to the compressor second stage 20.

Simultaneously, gaseous fuel 16 is discharged from fuel injectors 16f as a working gas stream and channeled first to the dry 26 and next wet 27 working channels of this additional cooler 24. Thereafter this fuel stream 16, moistened with evaporated water vapor, is transferred to the combustion chamber 2 for burning. Increasing humidity of fuel stream 16 helps the burning process in combustion chamber 2, reduces oxides of nitrogen (NOx) emissions, and increases the mass flow through the gas turbine 3, and thereby raises the power output.

Alternatively, ambient working air could instead be channeled through the dry and wet channels 26, 27 of the additional cooler 24 instead of the fuel 16, in the same manner as in the cooler 5.

The exemplary power systems introduced above, and additional power systems discloses hereinbelow, preferably use water 19 as the evaporative liquid for the various duplex exchangers, such as the precooler 5, the humidifier 9, intercooler 24, exhaust cooler 59, turbine cooler 60, desalination cooler 130, and condenser 202. This water 19 has to be good quality because it is circulating as water vapor through the power system equipment. Consequently it is desirable to return the water 19 back into the power cycle. Using the condenser 202 of FIG. 5 for dew point indirect evaporative cooling in the power cycle makes it possible to efficiently recover the evaporated water 19.

The condenser 202 illustrated in FIG. 5, may be constructed similarly to the cooler 5 also shown therein. Dew point indirect evaporative cooling is again effected using the product channel 6 and working dry 7 and wet 8 channels in the condenser 202 for condensation of water vapor 205 from the stack gas 17, after it first passes through the product channel 10 of the humidifier 9. The working air 28 in the condenser is channeled for evaporatively cooling the stack gas 17, and condensing the residual moisture therein.

Several different types of condensers, including water or air-cooled condensers, direct contact condenser, and evaporative condenser, etc., were evaluated and compared. But the condenser 202 which uses dew point indirect evaporative cooling is the best because, first of all, it is possible to reduce the temperature of the stack gas 17 during its passing through the product channel 6 of the condenser 202 to approach the dew point temperature of the entering working airstream 28. This temperature ensures that water vapor from stack gas 17 will be condensed and this condensate 205, like the water 19, can be easily put back into the power cycle. If the condensation water 205 is contaminated with combustion products, the cost for treating the water will be small. Only little treatment will be needed, for example, by using classical ion exchangers this can easily be obtained.

Figure 6:
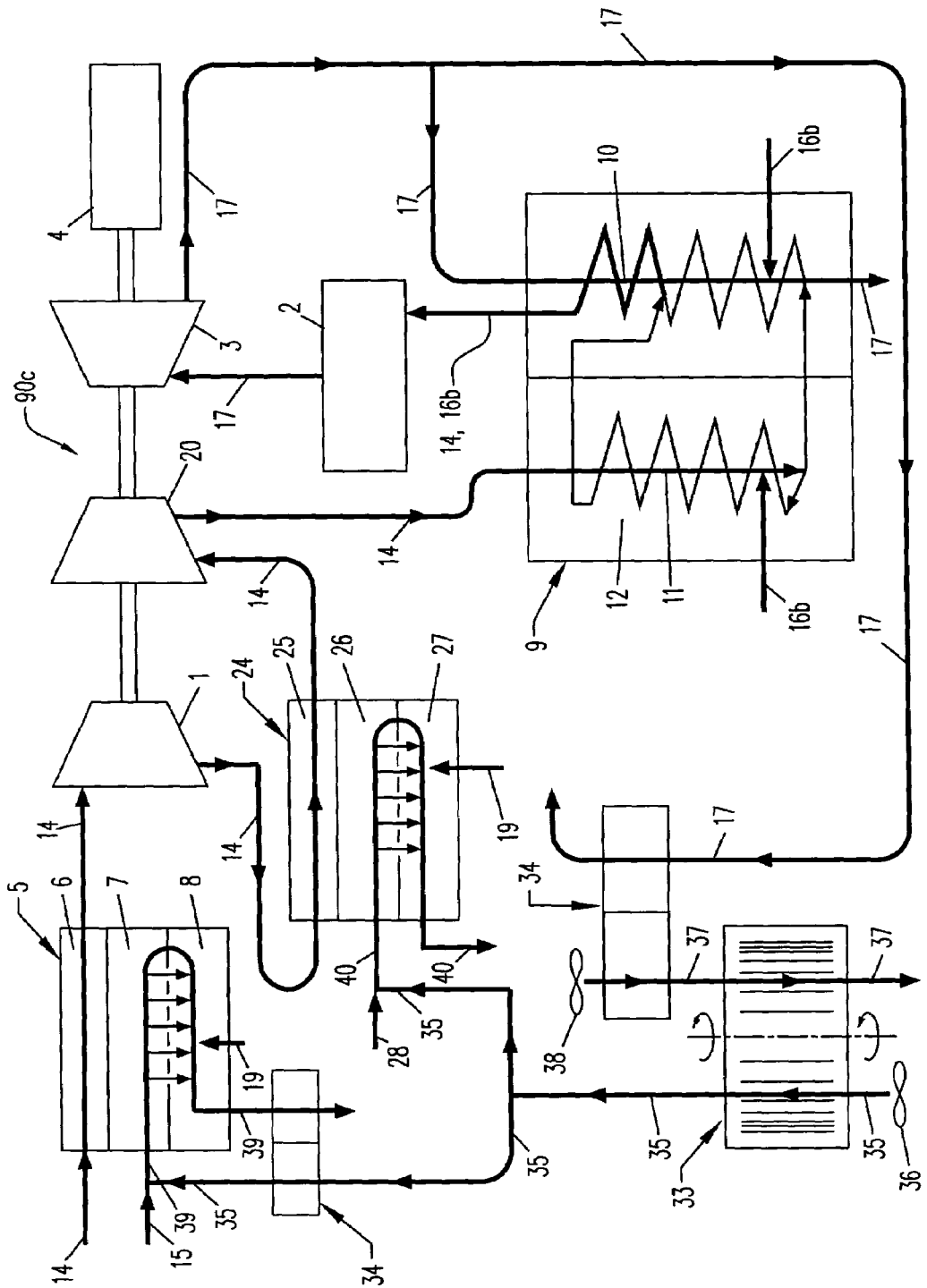
FIG. 6 is a schematic representation, like FIG. 5, of a gas turbine power system having two compression stages and three cooperating duplex exchangers, and a desiccant dehumidifier for predrying air to two of the duplex exchangers.

FIG. 6 illustrates another power system 90c, like FIG. 5, but which includes a dehumidifier device in the form of a desiccant wheel 33, with an air heater 34 for reactivation air 37, dry airstream 35, and fan 36 for dry airstream 35, and fan 38 for reactivation air 37.

To reduce temperature less than the dew point temperature and significantly increase density of the inlet air of gas turbines, it is desirable to use the dehumidifier in the form of the desiccant wheel 33, along with an air heater, or heat exchanger 34 for reactivation air 37, because dryer air has less dew point temperature. In this case outside air as a dry airstream 35 is passed through the desiccant wheel 33 where its humidity is reduced by absorption of water vapor in the desiccant material.

Hereafter, the dry airstream 35 is passed via another heater, or heat exchanger, 34 through the dry and next wet working channels of the cooler 5, or/and the additional cooler 24. The dry air 35 may be mixed with makeup air 15 for providing dry air 39 in cooler 5; and may be mixed with makeup air 28 for providing dry air 40 to the cooler 24. Simultaneously outside air as a reactivation airstream 37 is transferred to the first air heater 34 for contact with whole or part of stack gas 17 from the turbine 3. Thereafter, hot reactivation airstream 37 is directed to the desiccant wheel 33 for its recovery, i.e., absorbs water from desiccant material.

Because moist working airstream 15, after its passing at first through the dry 7 and next wet 8 working channels of the cooler 5, has high humidity and its temperature always being less than outside air temperature, it is desirable to use this working airstream 15 as a coolant for the generator 4, as shown in the FIG. 5 embodiment. In this case outside airstream as a working air 15, after its passing at first through the dry 7 and next wet 8 working channels of the cooler 5, is directed to the generator 4. This action helps to reject heat from the generator 4.

Figure 7:
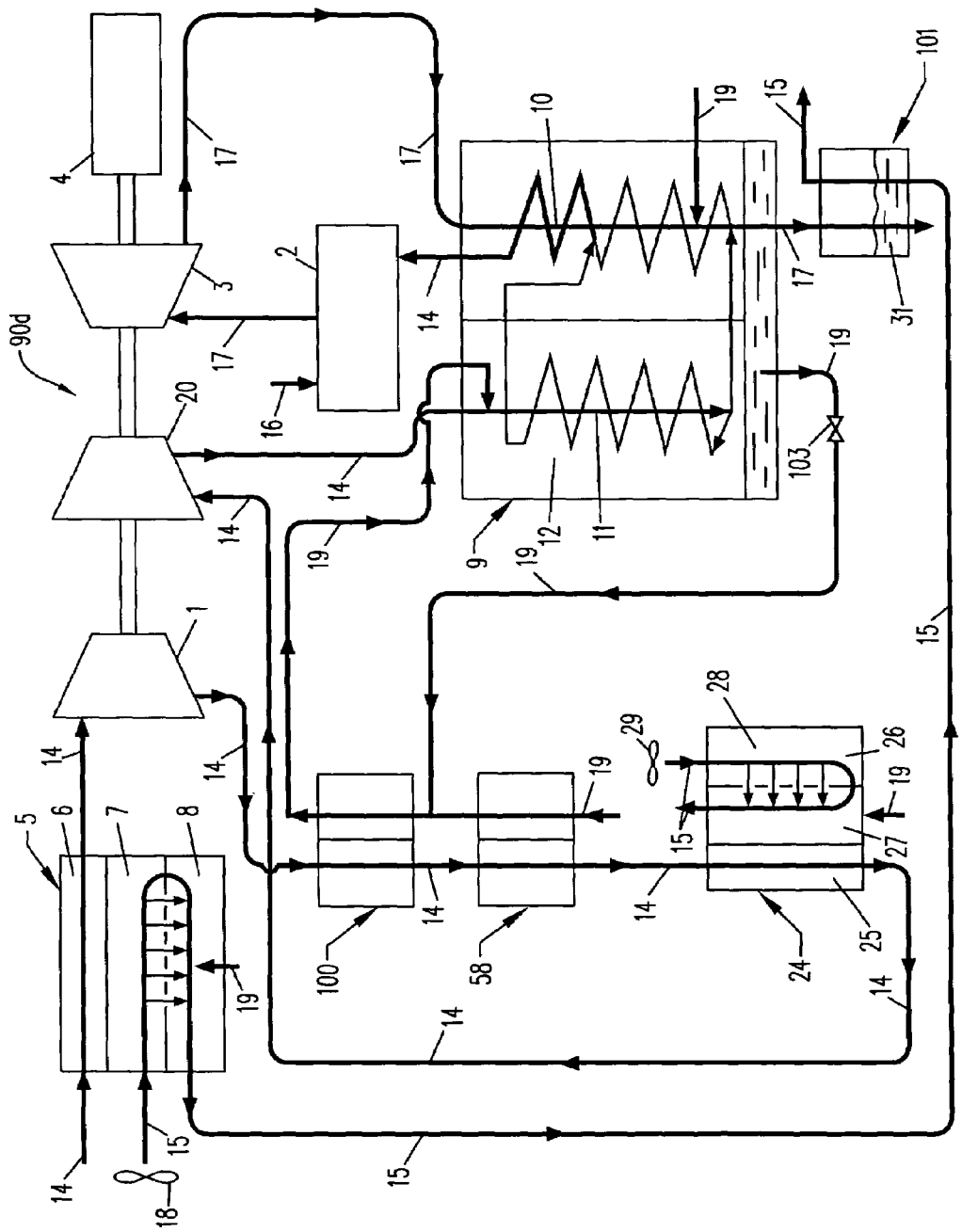
FIG. 7 is a schematic representation, like FIG. 5, of a gas turbine power system having two compression stages and three cooperating duplex exchangers, as well as cooperating heaters therein.

FIG. 7 illustrates another embodiment of the power system, 90d, where the additional cooler 24 cooperates with a first water heater, or heat exchanger, 58 and a second, recirculated water heater, or heat exchanger, 100 set up for efficient heat recovery processes from the hot compressed product air 14, after its passing through the first stage compressor 1. This recovery heat is used for heating fresh water 19 and recirculated water 19 before the use thereof for wetting the wet working channels 12 of the humidifier 9.

The product air 14, after its passing in series through the recirculated water heater 100, water heater 58, and product channels 25 of the additional cooler 24, is directed to the second stage compressor 20. During this passing the product air 14 is cooled toward the limit of the dew point temperature of outside air, increasing its density, and is directed to the second stage compressor 20.

In this system fresh water 19 and recirculated water 19, before it wets the wet working channels 12 of the humidifier 9, are directed accordingly to the water heater 58 and recirculated water heater 100 for heat exchange contact with the product air 14. Thereby water 19 is heated, and the hot water 19 more efficiently humidifies the product airstream 14 during its passing through the wet working channels 12 of the humidifier 9, prior to combustion, to increase the power output.

The working air 15, after its passing through the dry 7 and next wet 8 working channels of the cooler 5, may then be used for cooling and condensing the stack gas, because the temperature of the working air 15 is less than the temperature of outside air. In this case the working air 15 is directed to the gas cleaner/condenser 101 for direct or indirect contact with stack gas 17, after its passing through the product channels 10 of the humidifier 9. This system also contains an adjusting valve 103 which is used to regulate the quantity of fresh water and recirculated water 19.

Any conventional system for producing power demands a large water purification system, which had been considered a major technical impediment to the development of a steam-augmented gas turbine power plant which used the evaporative cooling process. For example, steam-augmented gas turbine systems are disclosed in U.S. Pat. Nos. 4,509,324 and 5,329,758. These systems are based on a steam-augmented gas turbine engine, which include a heat recovery system, an intercooler, and a water purification system.

General distiller purifies and desalinates the seawater to a level of preferably 200 parts per billion (ppb) of total dissolved solid since extremely high purity stream is required for injection into gas turbines. If this quality in not obtained, wash-down frequency must increase inordinately or serious damage may occur to the gas turbine. The water treatment system must also be designed to minimize power consumption. Various types of water distillers have been devised for generating distilled water. Two main directions survived the crucial evolution of desalination technology, namely evaporation and membrane techniques. However, such techniques are often complex in operation, expensive and consume large amounts of energy.

Figure 8:
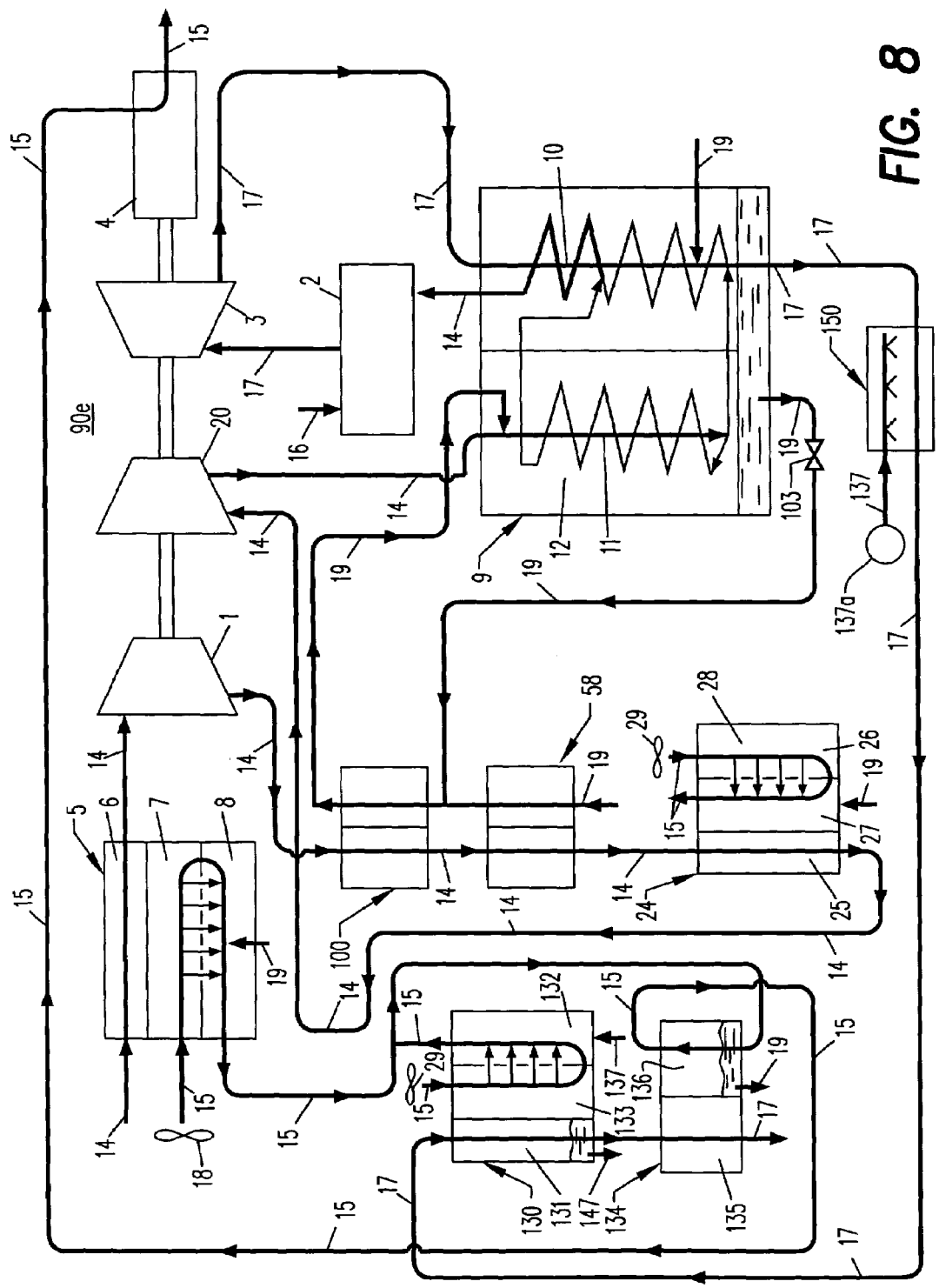
FIG. 8 is a schematic representation of a gas turbine power system, like FIG. 7, including a humidifier and additional duplex exchanger for desalinating salt water.

FIG. 8 illustrates another embodiment of a power system 90e incorporating an advanced water purification system which involves the evaporation of water from an aqueous salt solution upon contact with air and subsequent recovery of the water vapor from air by condensation. It is now possible to change the condition for evaporation and condensation to obviate the need for additional energy to carry out the water evaporative process.

More specifically, FIG. 8 illustrates a power system like that shown in FIG. 7, but modified to include a distillation subsystem, or a water purification system, for producing distilled water 19 from salt water 137 suitably introduced by corresponding water injectors 137a. This distillation system introduces another evaporative duplex counterheat exchanger in the form of a distillate cooler 130, and a cooperating conventional condenser 134. The distillate cooler 130 is another form of the dew point indirect evaporative cooler, like the coolers 5 and 24, which contains the product channels 131 and the dry 133 and wet 132 working channels.

The condenser 134 contains cooling channels 135 and condensing channels 136. Stack gas 17, after passing through the product channels 10 of the humidifier 9, via an evaporative humidifier 150 is directed as a product stream to the product channels 131 of the distillate cooler 130 and outside air as a working stream 15 is simultaneously directed to the dry working channels 133 of the distillate cooler 130 by fan 29. Thereafter the cold stack gas 17 is directed to the cooling channels 135 of the condenser 134.

After passing through at first to the dry 133 and next wet 132 working channels of the distillate cooler 130, the moist working airstream 15 may be directed, together with the moist working airstream 15 from the cooler 5 and/or additional cooler 24, to the condensing channels 136 of the condenser 134. The indirect heat transfer in the condenser 134 between the relatively cold stack gas 17 and moist working airstream 15 causes the water vapor to condense, resulting in the production of the distillated or desalinated water 19 in the condensing channels 136.

After passing through the condensing channels 136 of the condenser 134 the product airflow 15 may be used for cooling the generator 4. The distillated or desalinated water 19 can be used for wetting of the wet working channels of the cooler 5, additional cooler 24, humidifier 9, or for any purposes where there is need for distillated and drinking water.

Because the stack gas 17, after its passing through the product channels 10 of the humidifier 9, still has a high temperature, it is desirable to use it instead of outside air as a product stream. In this case, the stack gas 17 is directed from the product channels 10 of the humidifier 9 via the evaporative humidifier 150 at first to the product channels 131 of the distillate cooler 130 and next to the cooling channels 135 of the condenser 134. This permits the production of more distilled water 19 because the temperature of the stack gas is always higher than the temperature of outside air.

In addition, when stack gas 17 is passing through the product channels 131 of the distillate cooler 130, it is cooled below the wet bulb temperature and approaches the dew point temperature of the outside airstream 15. In this case the moist stack gas stream 17 causes the water vapor to condense from stack gas 17, resulting in the production of the condensed water 147 in the product channels 131 of the distillate cooler 130.

It is very important to cool gas turbine vanes and blades. Generally, turbine cooling has a detrimental effect on cycle performance. On the other hand turbine cooling allows a significant increase in the gas turbine inlet temperature. The cycle benefits from the high inlet temperature overcome the penalties of the cooling air bleed. The favorable trade between high gas path temperature and air-cooling of hot section parts has improved the gas turbine over recent years.

For example, U.S. Pat. No. 5,160,096 describes a humid air gas turbine cycle where the compressed air is humidified prior to introduction in the combustor. Compressed air, before humidification, is used to cool the first stage turbine rotor blades. Humidified air is used to cool the first stage turbine stationary vanes. But this patent cannot realize an effective humidifying process for the compressed air and cooling for gas turbine vanes and blades.

Figure 9:
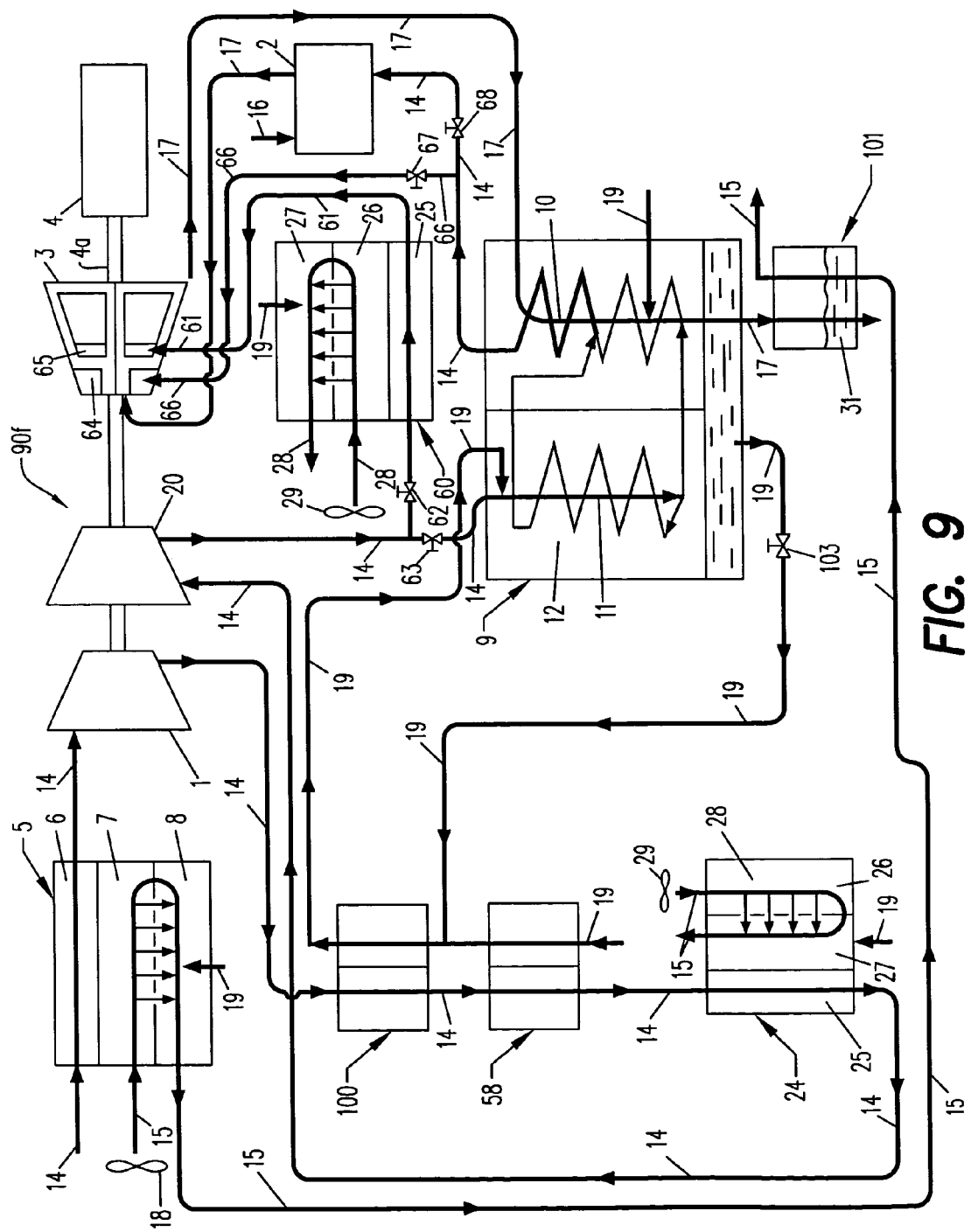
FIG. 9 is a schematic representation, like FIG. 7, with an additional duplex exchanger for providing cooling air to the gas turbine.

FIG. 9 illustrates another embodiment of the power system 90f where first stage nozzle vanes 64 are located upstream of first stage turbine rotor blades 65 in the rotor of the turbine 3, and are cooled by passing a portion 66 of the product compressed air 14. The humidifier 9 has humidified this air portion 66.

The first stage blades 65, on the other hand, are cooled by passing a portion 61 of the product compressed air 14 cooled in another evaporative duplex counterheat exchanger 60. This cooler 60 incorporates dew point indirect evaporative cooling, like the coolers 5 and 24 and the humidifier 9 also used in this embodiment. The air portion 61 has not yet been humidified, but has been cooled below the wet bulb temperature approaching the dew point temperature of outside air 28 passing through the product channels 25 of the turbine cooler 60.

The adjusting valves 62 and 63 regulate the quantity of air portion 61 and the product compressed air 14, before its humidification in the humidifier 9. The adjusting valves 67 and 68 regulate the quantity of air portion 66 and the product compressed air 14 after their humidification in the humidifier 9. And, the product compressed air 14 is directed via the combustion chamber 2 to the turbine 3 as the primary gas stream 14.

Another embodiment of the power system may be used for increasing performance of combustion engines such as an internal combustion diesel engine, or a spark ignited gasoline engine, or an external fired Ericsson cycle engine. An example of the external combustion approach is the "Afterburning Ericsson Cycle Engine" disclosed in U.S. Pat. No. 5,894,729. In this cycle air is first compressed, then preheated in a regenerator heat exchanger, then directed to an expander where it is heated by expansion chamber walls. After being heated the expanded fuel is burned to heat the expander walls, and finally the exhaust gases are directed back through the regenerator heat exchanger. The regenerator heat exchanger cannot humidify the compressed air prior to expansion for increasing the power output and combustion efficiencies.

Figure 10:
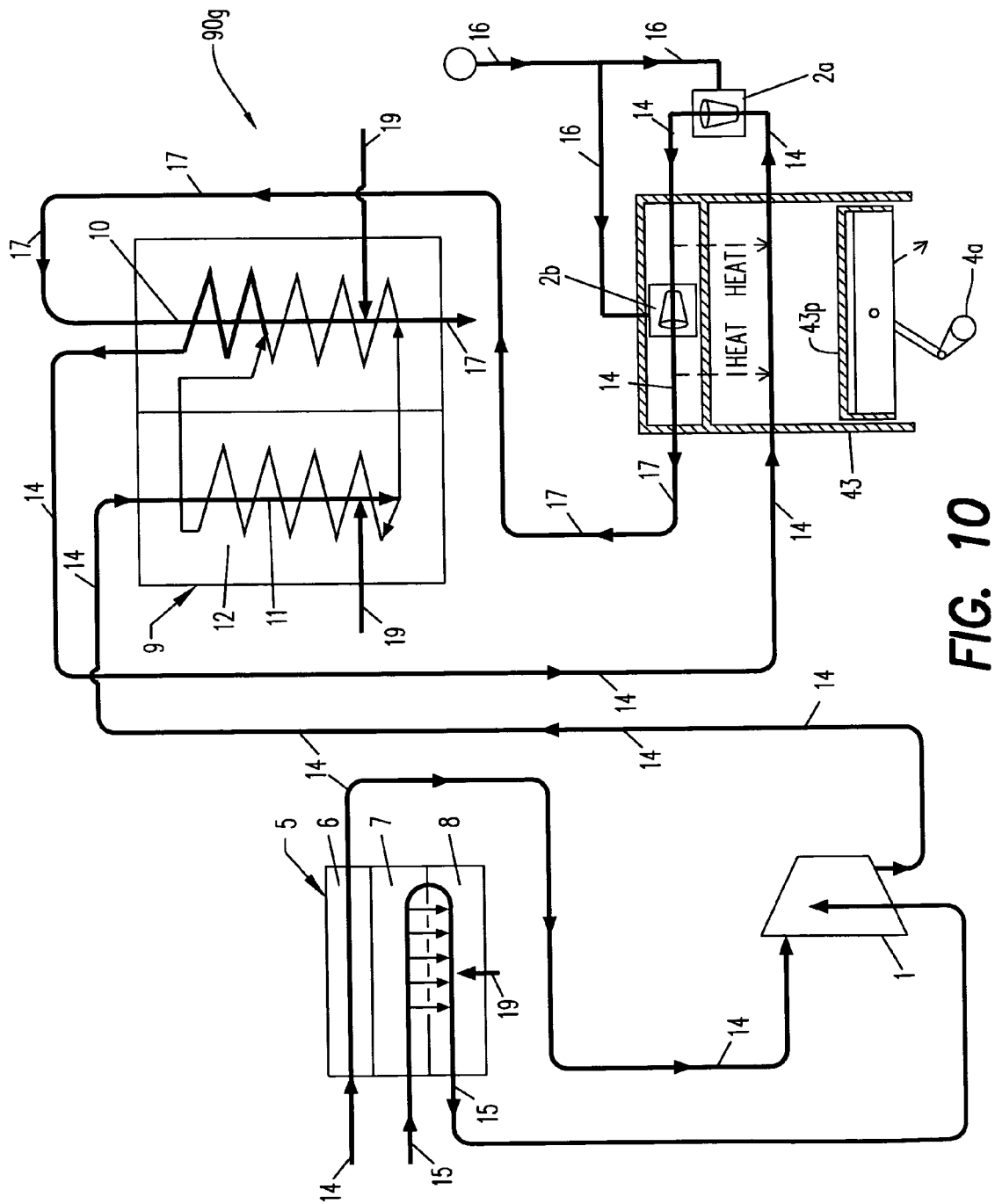
FIG. 10 is a schematic representation of an afterburning Ericsson Cycle Power Generation System and cooperating duplex exchangers.

In contrast, FIG. 10 is a schematic depiction of another power system 90g wherein the combustion chamber takes the form of primary and secondary afterburners 2a,b, the gas turbine is replaced by expander cylinder 43 and reciprocating piston 43p therein. The piston 43p is joined to a crankshaft or driveshaft 4a.

The exterior of the cylinder 43 is continually heated at all time by heated air and combustion products in an afterburning Ericsson Cycle Engine. Here outside airstream as a product air 14 is initially directed for cooling to the product channels 6 of the cooler 5. After passing through the product channels 6 this cold product airstream 14 is sucked by the air compressor 1, which discharges this airstream 14 at first to the dry 11 and next wet 12 working channels of the humidifier 9.

Passing through the dry 11 and wet 12 working channels, the airstream 14 increases its humidity and temperature by absorbing heat from stack gas 17, or hot combustion products thereof, which is directed from the expander 43 to the product channels 10 of the humidifier 9. Hereafter moist and hot airstream 14 is directed via expander 43 to the primary afterburner 2a for admixture with fuel 16. Fuel 16 is added to the fully expanded airstream 14 to form a combustible fuel-air mixture which is burned in the two afterburners to generate the hot exhaust gases, or stack gas 17.

Thereafter stack gas 17 from expander 43 is directed to the product channels 10 of the humidifier 9. Simultaneously outside airstream as a working air 15 is directed to the dry working channel 7 of the cooler 5. Here this moist airstream 15, after passing at first through the dry 7 and next wet 8 working channels, is directed, for example to cooling fins of the compressor 1 for its cooling.

The evaporative duplex counterheat exchangers may be used in other power systems for producing power and reaching high thermal efficiencies, such as systems based on the Rankine cycle, Kalina cycle, or in combined cycles, or wherever condensing process is used in power generation. The combined cycle typically includes two different power generation units: a gas turbine (Brayton cycle) as a topping unit, and a steam turbine (Rankine cycle) as a bottoming unit. Combined cycle systems are difficult to build at small scale with acceptable overall efficiencies.

However, using the duplex exchanger, heat energy in the exhaust (stack) gas from the gas turbine may be recovered and reused very efficiently in the topping unit and in the bottoming unit. It is therefore now possible to build small power plants with high efficiencies.

It is known that the bottoming unit (Rankine cycle) contains a heat recovery steam generator, a steam turbine, a conventional condenser, and a cooling tower, and this cycle has a small coefficient of performance. If a certain part of the stack gas from the gas turbine is used for a topping unit, but the rest is directed to a heat recovery steam generator of a bottoming unit, it is possible to increase the coefficient of performance of the whole system for producing power.

Figure 11:
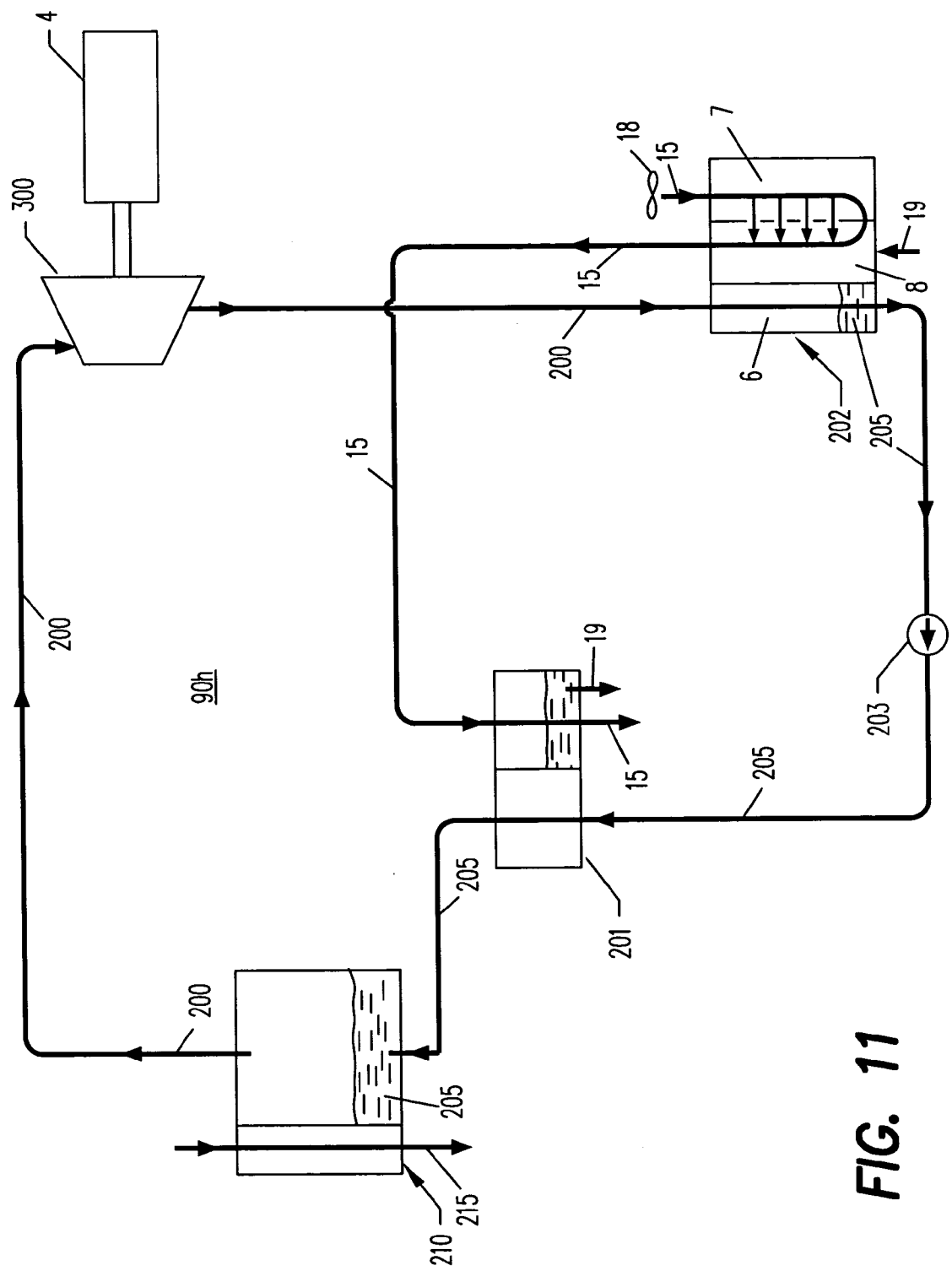
FIG. 11 is a schematic representation of a steam turbine and cooperating duplex exchanger.

FIG. 11 is a schematic depiction of a power system 90h using the Rankine cycle with a steam turbine 300, electrical generator 4, recuperator 201, and steam generator 210. This power system further includes another evaporative duplex counterheat exchanger in the form of a condenser 202 for dew point indirect evaporative cooling. The condenser 202 includes the product channel 6 and working dry 7 and wet 8 channels in the steam-turbine bottoming unit, for reducing temperature of the steam condensation, and also reducing pressure of condensation.

This configuration also offers the possibility to get cold water (condensate) 205 from the steam 200 in the product channel 6 of the condenser 202, with a temperature approaching the dew point temperature of the entering working airstream 15. This increases power output using the Rankine cycle alone, or in a combined cycle.

Furthermore, enhanced efficiency may be obtained when hot and moist outside air 15, after its passing through the dry 7 and wet 8 channels of the condenser 202, is directed to the recuperator 201 for indirect heat exchange contact with the cold water (condensate) 205, which is directed to the recuperator 201 by a pump 203. As a result of this contact, water vapor in the recuperator 201 is condensed as water 19 from air 15 and hereafter heat condensation as latent heat and also sensible heat are transferred from air 15 to the water 205. Thereafter the temperature of the water 205 is increased and this hot water (condensate) 205 is directed to the steam generator 210.

The method of using this power system permits recovery of heat condensation, which is otherwise wasted in the atmosphere using conventional condensers and/or cooling towers. Besides, the heat transfer process in the recuperator 201 between air 15 and the water (condensate) 205 is much better due to the latent heat than between the water (condensate) and steam in the conventional Rankine cycle systems.

It is well known that existing gas turbine power plants have one serious problem: corrosion. The materials used to channel the flow streams must not only withstand high pressures, but also high pressures at high temperatures, particularly in gases and combustion products, which tend to be corrosive. It is possible to reduce or eliminate this problem in a gas turbine power plant in which hot gases are expanded from a pressure near atmospheric pressure to a pressure substantially below atmospheric pressure, and then condensed, and compressed back to atmospheric pressure. For example, U.S. Pat. No. 3,369,361 describes a gas turbine power plant with sub-atmospheric spray cooled turbine discharge into exhaust compressor. But this patent has big disadvantages in realization of the cooling and humidifying processes; therefore, efficient power plants remain unavailable to the general public.

Figure 12:
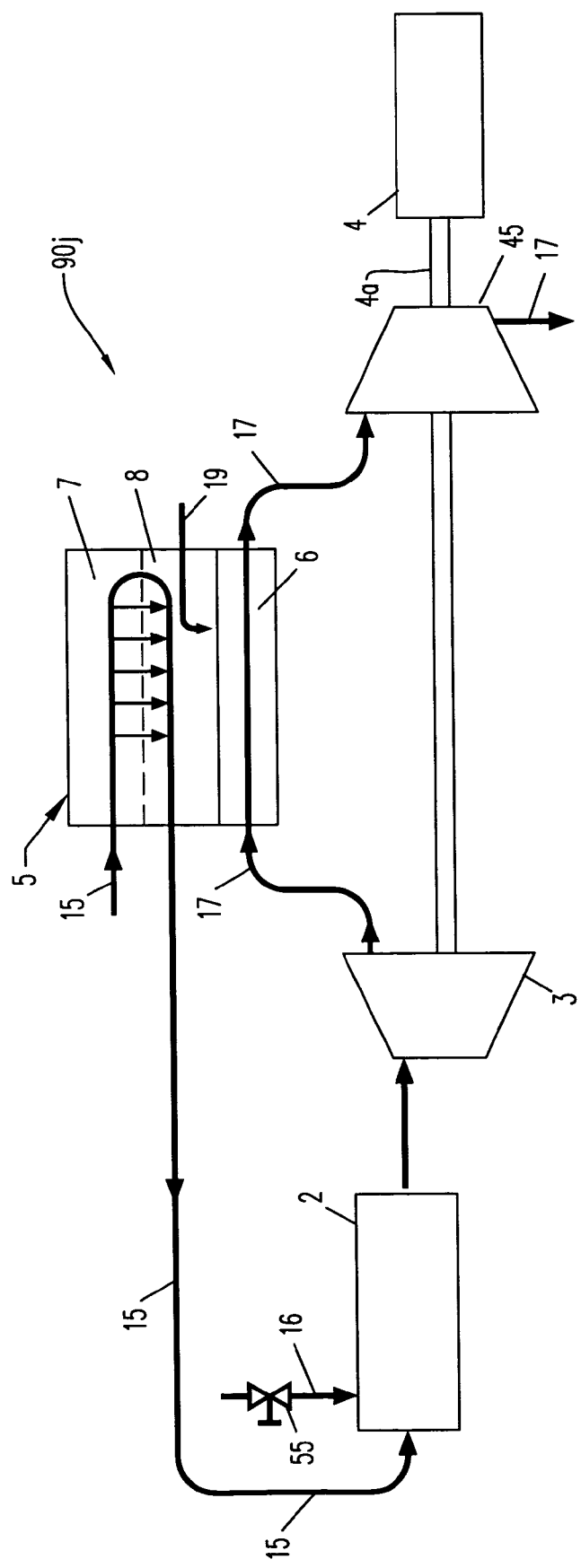
FIG. 12 is a schematic representation of a sub-atmospheric gas turbine power system including a duplex exchanger.

FIG. 12 is a schematic depiction of another power system 90j wherein the hot gases 17 are again generated in the combustion chamber 2, and expanded through the gas turbine 3, but to a pressure substantially below atmospheric pressure. This may be achieved by use of an exhaust compressor 45 axially coupled to the gas turbine 3. The adjusting valve 55 regulates the quantity of fuel 16 for the combustion chamber 2.

This system may also benefit from the dew point indirect evaporative cooler 5, with the product channels 6 and cooperating dry 7 and wet 8 working channels. Also this system includes in serial, consecutive flow the combustion chamber 2, the gas turbine 3, and exhaust compressor 45 powering the electrical generator 4. Outside air 15 is directed at first to the dry 7 and next wet 8 working channels of the cooler 5, and then the moist airstream 15 is transferred for admixture with fuel 16 for combustion in the combustion chamber 2.

Here this mixture is burned, and the hot gases directed to the gas turbine 3 wherein they are expanded to a pressure below atmospheric pressure. Thereafter stack gas from gas turbine 3 as a product stream 17 is directed for cooling to the product channels 6 of the cooler 5. Here this product stream 17 at low pressure is cooled below the wet bulb temperature and it approaches the dew point temperature of outside air without adding humidity. This results in reduction of volume of the stack gas inside the product channels 6 of the cooler 5.

Passing through the product channels 6 the cold stack gas 17 is sucked by the exhaust compressor 45 and compressed to atmospheric pressure and discharged to atmosphere. Thereby, effective dry cooling process for the stack gas 17 is provided between the gas turbine 3 outlet and the exhaust compressor 45 inlet. This substantially increases the density of the stack gas stream 17 into the exhaust compressor 45. The exhaust compressor 45 compresses the cold stack gas 17 thereby raising its pressure therein to atmospheric pressure at the exhaust compressor 45 outlet, where the stack gas 17 is exhausted to atmosphere.

The process of rejection of heat from the stack gas 17 during its passing through the product channels 6 of the cooler 5 is used to heat and humidify the outside air as working air 15 as it passes through at first to the dry 7 and next wet 8 working channels of the cooler 5. From the cooler 5, the moist working airstream 15 is directed for admixture with fuel 16 in the combustion chamber 2, where this mixture is burned more efficiency with reduced formation of oxides of nitrogen (NOx). Then the combustion product is directed to the gas turbine 3.

During passing through the wet 8 working channels, this working air 15 significantly increases its absolute humidity, which is always more than that obtainable from any other known methods of humidifying. The increased humidity increases the volumetric flowrate through the gas turbine 3. A higher volume of working air 15 means that there is more air to force the turbine 3 blades to turn, and thereby raise the power output. The adjusting valve 55 regulates quantity of fuel 16 for the combustion chamber 2, and thereby regulates power capacity of this power system.

The power system 90j of FIG. 12 offers a significant improvement in thermal efficiency of producing power. It is possible to utilize the gas turbine 3 with the exhaust compressor 45 to cool the inlet product stream 17 to the exhaust compressor 45, and simultaneously humidify the product stream 15 prior to combustion chamber 2. It also increases their power output and combustion efficiencies. Moreover both these processes are realized more effectively than known evaporative cooling and humidifying processes, and are effected using only one apparatus 5 for dew point indirect evaporative cooling.

It is also noted that all existing gas turbine power plants have big material problems which will not only withstand high pressures but also high pressures at high temperatures, particularly in stack gases and combustion products which tend to be corrosive. An effort to overcome these problems usually results in solutions involving considerable cost penalties, so that efficient power plants remain unavailable to the general public. The power system of FIG. 12 operates with small pressures at small temperatures, and resolves these problems and provides a more efficient and inexpensive power plant incorporating the gas turbine.

Figure 13:
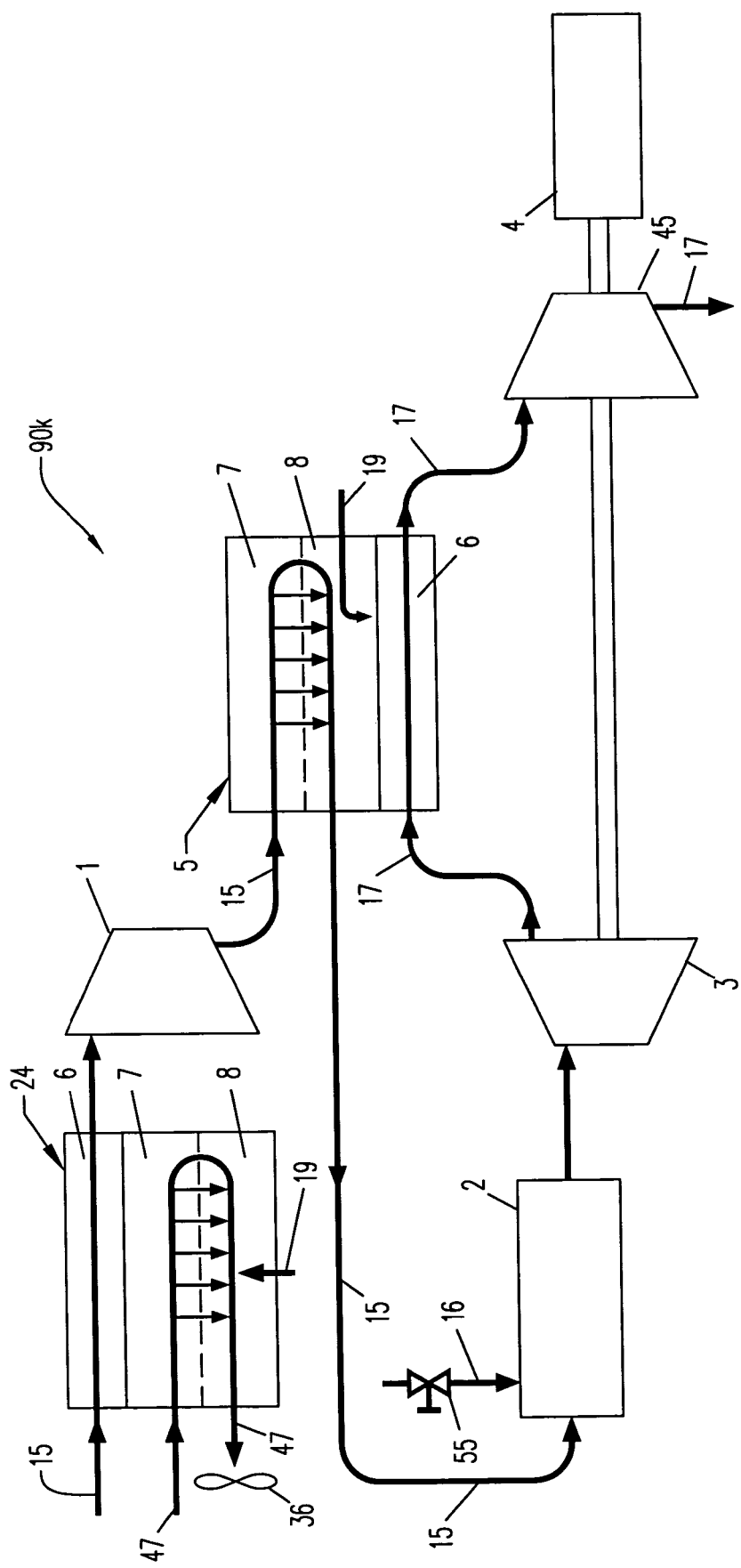
FIG. 13 is a schematic representation, like FIG. 12, of a sub-atmospheric power generation system including an inlet air compressor and cooperating duplex exchanger.

FIG. 13, like FIG. 12, illustrates another power system 90k based on sub-atmospheric gas expansion in the turbine 3 followed by the exhaust compressor 45. Furthermore, an inlet compressor 1 is also used prior to the cooler 5. This offers the possibility to increase difference pressures in the turbine and therefore increase power production.

Another evaporative duplex counterheat exchanger in the form of the additional cooler 24 is incorporated before the inlet compressor 1. Outside air as a product air 15 is precooled in the product channels 6 of this additional cooler 24 prior to its intake in compressor 1. Additional outside air 47 is drawn by fan 36 first through the dry channel 7 and then through the wet channel 8, in which water 19 is introduced for effecting dew point indirect evaporative cooling in the same manner described above. The product air 15 is therefore cooled to increase its density, which air is then sucked in by the compressor 1. Therefore using the additional cooler 24 can help to increase efficiency of the compressor 1.

Figure 14:
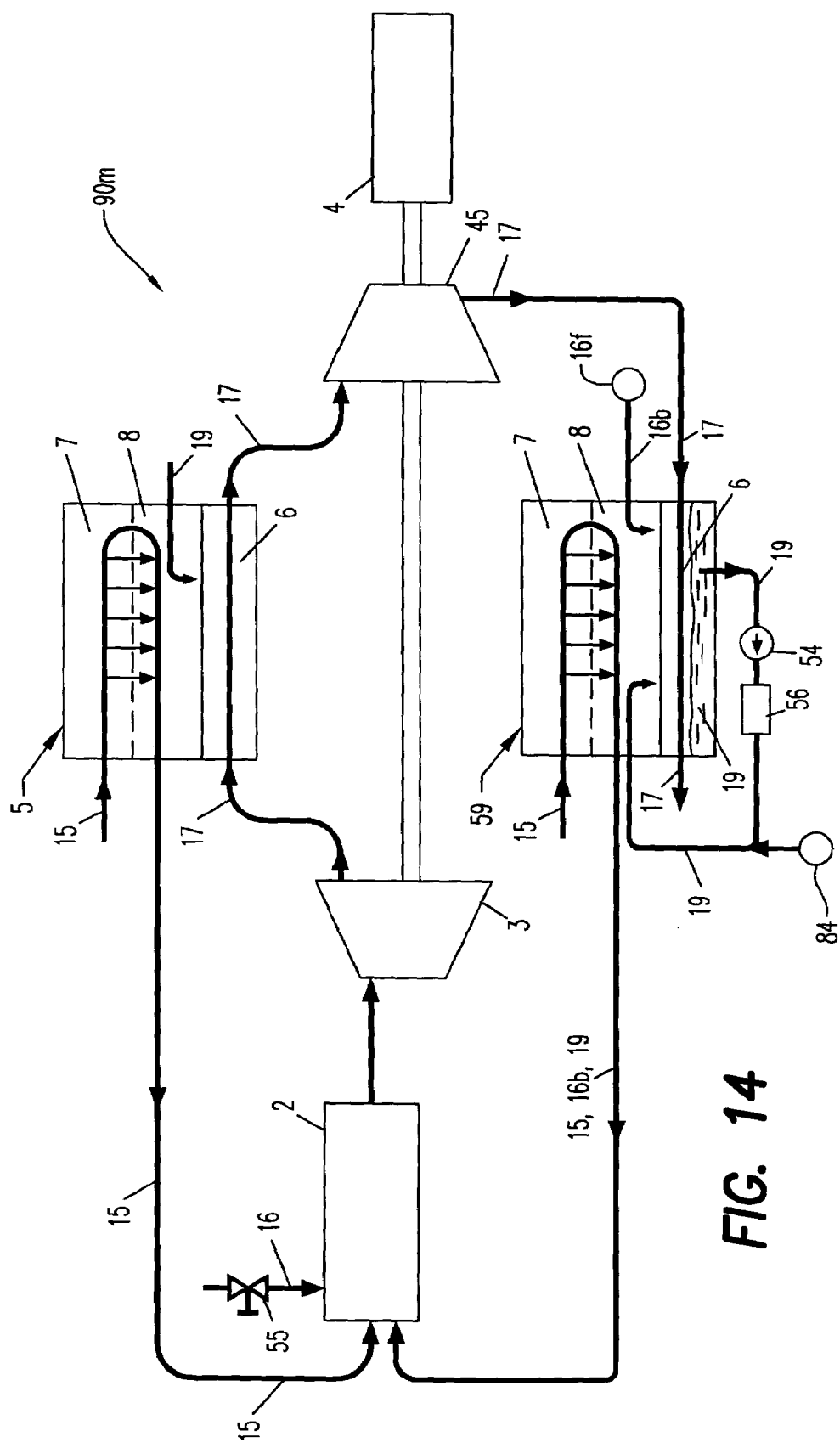
FIG. 14 is a schematic representation, like FIG. 12, of a sub-atmospheric power generation system including an additional duplex exchanger between an exhaust compressor and combustor.

FIG. 14 illustrates yet another power system 90m based on sub-atmospheric expansion of the stack gas 17, like FIG. 12, in which another evaporative duplex counterheat exchanger is used as an exhaust cooler 59. The cooler 59 is similarly based on dew point indirect evaporative cooling, with the product channels 6 and cooperating dry 7 and wet 8 working channels.

The exhaust compressor 45 discharges the stack gas 17 to the product channels 6 of the exhaust cooler 59. Here this stack gas 17 at atmospheric pressure is cooled below the wet bulb temperature and it approaches the dew point temperature of outside air 15 without adding humidity. This results in reduction of volume and condensation of the stack gas 17 inside the product channels 6 of the exhaust cooler 59.

Simultaneously outside air as the working air 15 is directed at first to the dry 7 and next wet 8 working channels of this exhaust cooler 59. In the wet channels, atomized liquid fuel 16b is discharged from fuel injectors 16f into the cooled air 15 for fuel saturation thereof. The fuel-saturated air 15 is then channeled to the combustion chamber 2 for burning. In this way, cooled air may be provided to the combustion chamber from both coolers 5 and 59, with fuel being separately added to the air from the cooler 5, and integrally added to the air from the cooler 59.

Water condensate from the product channels 6 can be transported via a condensate separator 56 to the wet working channels 8 of the exhaust cooler 59 by a pump 54, with additional makeup water 19 being provided by the means 84. This offers the possibility to reduce expense for evaporative liquid. Also it helps to condense some polluting components, condensate, from the stack gas 17 and improves its cleaning before discharge to atmosphere.

The exhaust cooler 59 offers a significant improvement in thermal efficiency of this system. The heat of compression of the hot stack gas 17 from the exhaust compressor 45 is used for humidifying outside air as the product stream 15 prior to combustion chamber 2. This increases power output and combustion efficiencies.

The various power systems described above can be efficiently used with liquid fuel being used as the evaporative liquid in the wet working channel 12 of the humidifier 9, or in the wet working channels 8 of the cooler 5, or in the exhaust cooler 59. Liquid fuel, such as gasoline etc., enjoys dew point temperatures less than that of water in air, and can be used in the wet working channels of the various duplex exchangers under corresponding pressure and temperature. The liquid fuel may be any suitable liquid fuel that has a high vapor pressure at the ambient temperature and pressure so as to enhance evaporation and thus take the heat of transformation from the remaining fluid.

Even so, the latent heat of evaporation of water is always more than the latent heat of evaporation of any kind of liquid fuel, but the saturation temperature of liquid fuel is always lower than the saturation temperature of water. This has advantages in heat transfer and in efficiencies.

Therefore, if liquid fuel 16b is used for the combustion chamber 2 in the FIG. 6 embodiment, it is desirable to use this liquid fuel 16b as the evaporative liquid for the wet working channels of the humidifier 9 which receives compressed air 14 from the compressor 20 in which the evaporated fuel 16b is added for combustion in the combustion chamber 2. This is important for vehicle systems for producing power where there are problems with consumption of water. In addition, the airstream after its contact with liquid fuel in the wet channel, creates the perfect fuel-air mixture.

Thereafter this mixture is directed for combustion to the combustion chamber 2 or to the internal combustion engine of a vehicle and it helps to improve the combustion process in the combustion chamber 2 or engine. As a result the exhaust gases have less toxicity. Alternatively, both liquid fuel and water may be used as the evaporative liquid for the wet working channels.

For example, FIG. 14 illustrates another configuration for producing power wherein both water 19 and liquid fuel 16b are used as the evaporative liquid in the wet working channels 8 of the exhaust cooler 59. The liquid fuel 16b should be introduced at the beginning of the wet channels 8 where the working air is coldest, near the dew point temperature of the liquid fuel and air mixture. This maximizes heat recovery from the stack gas 17, and maximizes condensation of the water therefrom.

Thereafter the water vapor and evaporated fuel and air mixture are directed to the combustion chamber 2 or to the internal combustion engine of a vehicle. In this case, water 19 is evaporated into the airstream 15 inside the outlet stage of the wet working channel 8 where occurs maximum influx of the heat from the warm outside airstream 15 when it enters the dry working channel 7. Here the different temperatures between airstreams 15 in the dry 7 and wet 8 working channels is maximum.

The large value of the latent heat of water 19 promotes active rejection of the heat in this stage from the warm outside airstream 15, realizing its precooling process in dry working channel 7. When the last stage of the precooled airstream 15 is directed from the dry 7 to wet 8 working channels the different temperatures between airstreams in these channels is small and heat flux is small too. In this case the latent heat of the evaporative liquid is not important for the heat exchange process but it is very important in the temperature of saturation. Because the saturation temperature of liquid fuel 16b is always lower than the saturation temperature of water 19 it is desirable to use liquid fuel 16b as the evaporative liquid in the entering zone of the wet 8 working channel.

The wetting area of the working channel 8 may be apportioned 95-60% for the water 19, and 5-40% for the liquid fuel 16b. Using both water 19 and liquid fuel 16b as an evaporative liquid for the wet working channel 12 of the of the humidifier 9 or for the wet working channels 8 of the cooler 5 and exhaust cooler 59 permits the reduction in temperature of stack gas before its discharge to atmosphere. As a result, it increases thermo-efficiency of the system for producing power.

Evaporation of the fuel in the exhaust cooler 59 instead of the combustion chamber 2 increases thermal efficiency of the gas. In addition it increases the water vapor in the fuel-air mixture which is directed to the combustion chamber 2 or engine of a vehicle, and it helps to improve the combustion process. As a result, the exhaust gases from them have less NOx and toxicity.

It is very efficient to use dry air as the product and/or working air for the various configurations of the duplex exchangers described above which operate by dew point indirect evaporative cooling. These duplex exchangers 70,86 may have various configurations for effecting dew point indirect evaporative cooling, and include for example the coolers 5,24,59,60,130, humidifiers 9, and condenser 202 in the various power systems. The air may be dried with liquid desiccants such as Lithium chloride, bromide, calcium chloride, glycol, triethylene glycol, etc., and solid desiccants such as silica gel, molecular sieve, synthetic silicates, zeolites, etc.

If the product channels and/or dry working channels of the apparatuses for dew point indirect evaporative cooling are covered by the solid or liquid desiccant, this allows cooling below the dew point temperature of outside air because it reduces the moisture content and thus increases the latent heat potential capacity. As a result, efficiency of the systems for producing power is increased. Reactivation of the solid or liquid desiccant can take place within the apparatuses for dew point indirect evaporative cooling by the methods which are described in the U.S. Pat. No. 6,497,107, or the hot stack gas 17 can be used for reactivation of the solid or liquid desiccants.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

What is claimed is:

1. A power system comprising:
   a driveshaft;
   means for extracting energy from a hot gas stream to power said driveshaft;
   an evaporative duplex counterheat exchanger including a first heat exchanger having a first main flow channel and counterheat channel joined in flow communication with said first main flow channel, a second heat exchanger having a second main flow channel adjacent said counterheat channel, and means for injecting an evaporative fluid into said counterheat channel; and
   said duplex exchanger being joined in flow communication with said energy extracting means.

2. A system according to claim 1 wherein:
   said first and second main flow channels are disposed in concurrent and parallel flow; and
   said counterheat channel is disposed in opposition to both said first and second main flow channels for evaporatively cooling flow channeled therethrough.

3. A system according to claim 2 wherein:
   said first and second main flow channels are independent from each other and from said counterheat channel for maintaining dry flow channeled therethrough; and
   said counterheat channel is disposed between said first and second main flow channels for wetting flow discharged from said first main flow channel to evaporatively cool said first and second main flow channels.

4. A system according to claim 3 wherein said counterheat channel is disposed in crossflow with said first and second main flow channels.

5. A system according to claim 3 wherein counterheat channel is disposed in counterflow with said first and second main flow channels.

6. A system according to claim 3 wherein said counterheat channel extends in common between said first and second main flow channels in common flow communication with a discharge end of said first main flow channel.

7. A system according to claim 6 wherein said first main flow channel includes a series of perforations for providing intermediate flow communication with said counterheat channel.

8. A system according to claim 3 wherein said counterheat channel includes independent portions adjacent said first and second main flow channels, and commonly joined in split flow communication with a discharge end of said first main flow channel.

9. A system according to claim 8 wherein said counterheat channel includes a first portion disposed in counterflow with said first main flow channel, and a second portion disposed in counterflow with said second main flow channel.

10. A system according to claim 3 wherein:
said energy extracting means includes an outlet for discharging said gas stream as exhaust flow; and
said duplex exchanger is disposed in flow communication with said exhaust outlet for receiving said exhaust flow therefrom.

11. A system according to claim 10 wherein said second main flow channel of said duplex exchanger is disposed in flow communication with said exhaust outlet.

12. A system according to claim 11 wherein:
said energy extracting means further includes an inlet for receiving said hot gas stream as inlet flow; and
said inlet is disposed in flow communication with said counterheat channel of said duplex exchanger for receiving flow therefrom.

13. A system according to claim 12 further comprising:
a compressor for pressurizing air and discharging said pressurized air from an outlet thereof; and
said first main flow channel of said duplex exchanger is disposed in flow communication with said compressor for receiving hot pressurized air therefrom.

14. A system according to claim 13 wherein said evaporative fluid is water for adding water vapor to said pressurized air in said counterheat channel to increase mass of said hot gas stream channeled to said energy extracting means.

15. A system according to claim 13 wherein said evaporative fluid is fuel for adding fuel vapor to said pressurized air in said counterheat channel to increase mass of said hot gas stream channeled to said energy extracting means.

16. A system according to claim 13 further comprising a combustor disposed in flow communication between said counterheat channel of said duplex exchanger and said inlet of said energy extracting means.

17. A system according to claim 16 further comprising means for injecting fuel into said combustor for combustion with said pressurized air received from said duplex exchanger.

18. A system according to claim 17 wherein said energy extracting means comprises a turbine joined to said driveshaft.

19. A system according to claim 13 further comprising an afterburner disposed in flow communication between said outlet of said energy extracting means and said second main flow channel of said duplex exchanger for providing hot combustion gases to said duplex exchanger.

20. A system according to claim 19 wherein said energy extracting means comprises a reciprocating piston in a corresponding expansion cylinder and joined to said driveshaft.

21. A system according to claim 13 wherein:
said evaporative duplex counterheat exchanger defines a first duplex exchanger;
said compressor includes an inlet for receiving air for compression; and
further comprising a second evaporative duplex counterheat exchanger joined in flow communication with said compressor inlet for providing precooled air thereto.

22. A system according to claim 21 wherein second duplex exchanger includes a corresponding second main flow channel disposed in flow communication with said compressor inlet for providing said precooled air thereto by evaporative cooling from a corresponding first main flow channel and counterheat channel thereof.

23. A system according to claim 13 further comprising:
first and second stage compressors disposed in serial flow communication with said evaporative duplex counterheat exchanger as a first duplex exchanger;
a second evaporative duplex counterheat exchanger disposed in flow communication with said first stage compressor for precooling air thereto; and
a third evaporative duplex counterheat exchanger disposed in flow communication between said first and second stage compressors for interstage cooling said pressurized air therebetween.

24. A system according to claim 23 wherein:
said second duplex exchanger includes a corresponding second main flow channel joined in flow communication with said first stage compressor;
said third duplex exchanger includes a corresponding second main flow channel joined in flow communication between said first and second stage compressors; and
both said second and third duplex exchangers further include respective first main flow channels and counterheat channels for evaporatively cooling flow channeled through said respective second main flow channels thereof.

25. A system according to claim 24 further comprising means for channeling ambient air through said first main flow channels of said second and third duplex exchangers.

26. A system according to claim 24 further comprising:
means for channeling air through said first main flow channel of said second duplex exchanger; and
means for channeling fuel through said first main flow channel of said third duplex exchanger.

27. A system according to claim 24 further comprising a dehumidifier disposed in flow communication with said first main flow channels of said second and third duplex exchangers for drying air channeled thereto.

28. A system according to claim 27 wherein said dehumidifier comprises a desiccant wheel.

29. A system according to claim 28 further comprising a heater joined in flow communication between said energy extracting means and said dehumidifier for providing hot reactivation air therefor.

30. A system according to claim 24 further comprising a heater joined in flow communication between said second stage compressor and said third duplex exchanger for recirculating and heating said evaporative fluid from said first duplex exchanger using heat from said pressurized air flowing between said second stage compressor and said third duplex exchanger.

31. A system according to claim 24 further comprising:
a humidifier disposed in flow communication with said second main flow channel of said first duplex exchanger for receiving hot exhaust flow therefrom;
means for injecting salt water into said humidifier;
a fourth evaporative duplex counterheat exchanger disposed in flow communication with said humidifier for receiving a hot humidified stream therefrom for cooling thereof; and
condenser disposed in flow communication with said fourth duplex exchanger for condensing desalinated water from said humidified stream.

32. A system according to claim 24 further comprising:
a fourth evaporative duplex counterheat exchanger disposed in flow communication with said compressor in parallel flow with said first duplex exchanger for receiving a portion of said pressurized air from said compressor; and
said fourth duplex exchanger being further disposed in flow communication with said energy extracting means for providing said pressurized air portion to said energy extracting means as cooled dry air.

33. A system according to claim 32 wherein said energy extracting means comprises a turbine joined to said driveshaft and including rotor blades joined in flow communication with said fourth duplex exchanger for cooling thereof.

34. A system according to claim 33 wherein:
said turbine further includes nozzle vanes disposed upstream of said rotor blades; and
said counterheat channel of said first duplex exchanger is additionally joined in flow communication with said vanes for providing humidified cooling air thereto.

35. A system according to claim 11 wherein:
said energy extracting means comprises a steam turbine having a inlet for receiving hot pressurized steam, and an outlet for discharging steam to said second main flow channel of said duplex exchanger; and
said duplex exchanger comprises a condenser for cooling and condensing water from said steam.

36. A system according to claim 35 further comprising:
a steam generator disposed in flow communication with said turbine for providing said steam thereto; and
a recuperator disposed in flow communication with both said steam generator and said duplex exchanger for heating said condensed water from said duplex exchanger prior to delivery to said steam generator using heat recovered from air channeled through said first main flow channel and said counterheat channel of said duplex exchanger.

37. A system according to claim 11 wherein:
said energy extracting means comprises a turbine joined to said driveshaft;
said second main flow channel of said duplex exchanger includes an inlet disposed in flow communication with said turbine outlet; and
further comprising an exhaust compressor disposed in flow communication with said second main flow channel of said duplex exchanger for sucking flow therefrom.

38. A system according to claim 37 wherein said counterheat channel of said duplex exchanger is disposed in flow communication with an inlet of said turbine.

39. A system according to claim 38 further comprising a combustor disposed in flow communication between said counterheat channel of said duplex exchanger and said turbine inlet.

40. A system according to claim 39 further comprising:
an air compressor disposed in flow communication with said first main flow channel of said duplex exchanger for providing pressurized air thereto; and
a second evaporative duplex counterheat exchanger disposed in flow communication with said air compressor for providing precooled dry air thereto.

41. A system according to claim 39 further comprising a second evaporative duplex counterheat exchanger disposed in flow communication between said exhaust compressor and said combustor for providing wet air to said combustor.

42. A system according to claim 41 wherein:
said counterheat channel of said second duplex exchanger is disposed in flow communication with said combustor for channeling combustion air thereto; and
said injecting means are configured for injecting both water and fuel into said counterheat channel for evaporation in said combustion air.

43. A method of using said power system according to claim 3 comprising:
channeling said hot gas stream through said energy extracting means for extracting energy therefrom to power said driveshaft;
discharging said gas stream from said energy extracting means as exhaust flow;
channeling said exhaust flow through said second main flow channel of said duplex exchanger;
channeling air through said first main flow channel; and
injecting said evaporative fluid into said counterheat channel for saturating said air flowing therethrough and cooling both said exhaust flow in said second main flow channel, and said air in said first main flow channel below the wet bulb temperature thereof.

44. A method according to claim 43 further comprising discharging said saturated air from said counterheat channel into said energy extracting means for adding mass to said hot gas stream.

45. A method according to claim 44 wherein said energy extracting means comprises a turbine and further comprising:
compressing air to form hot pressurized air;
channeling said hot pressurized air through said first main flow channel of said duplex exchanger for being saturated in said counterheat channel; and
mixing fuel with said saturated air discharged from said counterheat channel and burning the mixture thereof to produce said hot gas stream channeled through said turbine for energy extraction therefrom.

46. A method according to claim 45 wherein said evaporative fluid is water for adding water vapor to said pressurized air in said counterheat channel to increase mass of said hot gas stream channeled to said energy extracting means.

47. A method according to claim 45 wherein said evaporative fluid is fuel for adding fuel vapor to said pressurized air in said counterheat channel to increase mass of said hot gas stream channeled to said energy extracting means.

48. A method according to claim 45 wherein:
said evaporative duplex counterheat exchanger defines a first duplex exchanger; and
said air, prior to compression, is precooled in a second evaporative duplex counterheat exchanger through a corresponding second main flow channel thereof.

49. A method according to claim 48 further comprising compressing said air in two stages, using said second duplex exchanger to precool air delivered to said first stage, and using a third evaporative duplex counterheat exchanger to interstage cool said pressurized air between said two stages through a corresponding second main flow channel thereof.

50. A method according to claim 49 wherein:
both said second and third duplex exchangers further include corresponding first main flow channels and counterheat channels in respective flow communication therewith; and
further comprising channeling air or fuel through said first main flow channels of said second and third duplex exchangers.

51. A method according to claim 50 wherein said evaporated fluid is water injected into said counterheat channels of said first, second, and third duplex exchangers.

52. A method according to claim 51 further comprising dehumidifying air channeled to said first main flow channels of both said second and third duplex exchangers.

53. A method according to claim 51 further comprising heating and recirculating said evaporative fluid water from said first duplex exchanger using heat from said pressurized air channeled to said third duplex exchanger.

54. A method according to claim 49 further comprising:
humidifying exhaust flow from said second main flow channel of said first duplex exchanger using salt water; and
channeling said humidified exhaust flow from said first duplex exchanger through a corresponding second main flow channel of a fourth evaporative duplex counterheat exchanger for cooling said exhaust flow and condensing desalinated water therefrom.

55. A method according to claim 49 further comprising:
splitting in first and second portions said pressurized air after compression in said two stages;
channeling said first split air portion to said first duplex exchanger;
channeling said second split air portion to a corresponding second main flow channel of a fourth evaporative duplex counterheat exchanger for cooling therein; and
channeling said cooled second split air portion from said fourth duplex exchanger to said turbine.

56. A method according to claim 55 wherein:
said turbine includes nozzle vanes disposed upstream from rotor blades;
said cooled second split air portion is channeled to said rotor blades for cooling thereof; and
further comprising splitting humidified air from said counterheat channel of said first duplex exchanger in one portion for burning, and in another parallel flow portion channeled to said nozzle vanes for cooling thereof.

57. A method according to claim 44 wherein said energy extracting means comprises a reciprocating piston joined to said driveshaft.

58. A method according to claim 44 wherein:
said energy extracting means comprises a steam turbine; and
further comprising channeling hot pressurized steam to said turbine, with exhaust flow therefrom being channeled to said second main flow channel of said duplex exchanger for condensing water therefrom.

59. A method according to claim 44 wherein:
said energy extracting means comprises a turbine joined to said driveshaft; and
further comprising sucking flow from said second main flow channel of said duplex exchanger for compression thereof to atmospheric pressure.

* * * * *